Nov. 28, 1967  B. HARRIS  3,355,715
TIME SYNCHRONIZING SYSTEM
Filed Jan. 27, 1965  11 Sheets-Sheet 1

INVENTOR.
BEN A. HARRIS
BY John A. Harvey
ATTORNEY

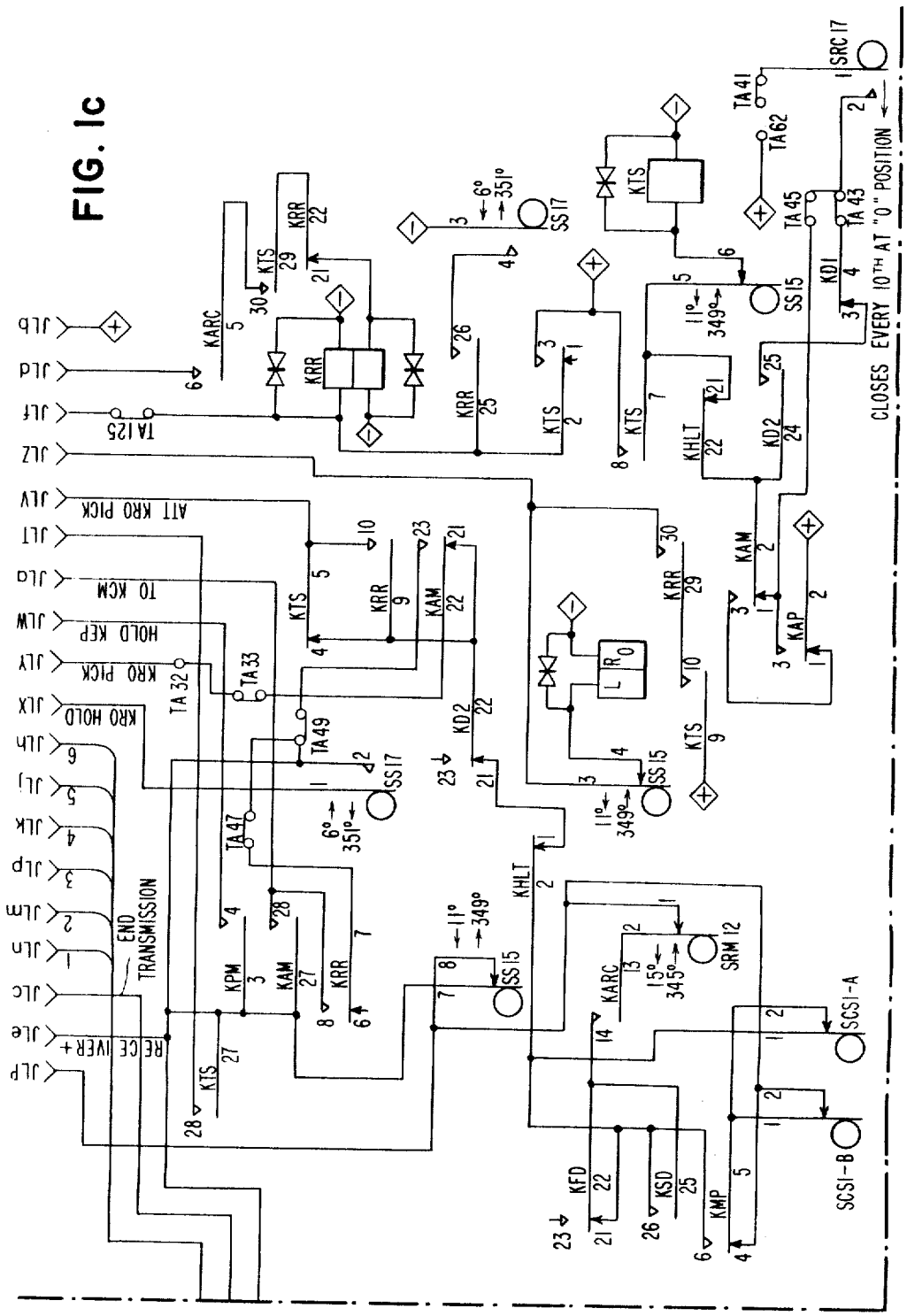

Nov. 28, 1967     B. HARRIS     3,355,715

TIME SYNCHRONIZING SYSTEM

Filed Jan. 27, 1965     11 Sheets-Sheet 10

INVENTOR.
BEN A. HARRIS
BY John A. Harvey
ATTORNEY

United States Patent Office 3,355,715
Patented Nov. 28, 1967

3,355,715
TIME SYNCHRONIZING SYSTEM
Ben Harris, Rochester, N.Y., assignor to Friden, Inc., a corporation of Delaware
Filed Jan. 27, 1965, Ser. No. 428,492
25 Claims. (Cl. 340—172.5)

ABSTRACT OF THE DISCLOSURE

A system for synchronizing a hundredths-hour time register by use of an electrical synchronizing pulse transmitted at a preselected minute within each hour by a master clock, recording time in hours and minutes, includes two local clocks conveniently identified as "A" and "B" clocks. The latter are controlled to be alternately operative to advance the register at each hundredths hour. The "A" clock operates the register between hourly synchronizing or corrective intervals, and the "B" clock operates the register during the synchronizing or corrective interval which effectively begins with transmission of the master clock hourly synchronizing pulse to start operation of the "B" clock and temporary halt operation of the "A" clock at the end of an operating cycle of the latter. Depending upon which particular odd or even hourly minute the master clock transmits its synchronizing pulse, the local "B" clock advances the register a preselected interval after the start of operation of this clock. The register has provision for detecting when it reaches a time synchronous value. If it reaches this value before the hourly synchronizing pulse is transmitted, the operation of the "A" clock continues to advance the register without synchronizing correction and an alarm is sounded to call attention to the need for manual correction of the register time reading. If the register is fast by only a small amount and is to be advanced to the next hundredths hour after the time synchronous value, the hourly synchronizing pulse will start the "B" clock and further advance of the time register is delayed awaiting the appropriate time for its advance by the "B" clock. If the register reaches the time synchronous value upon the second advance by the "B" clock, its time setting is known to be correct and the "B" clock is halted after one more advance of the register by it whereupon the "A" clock starts and operates the register until the next time corrective interval. If the time synchronous value of the register is not reached upon the second advance of it by the "B" clock, the register is continuously advanced until it records (and is halted at) the time synchronous value after which the advance operation is that last described.

---

Figures 1, 1A:
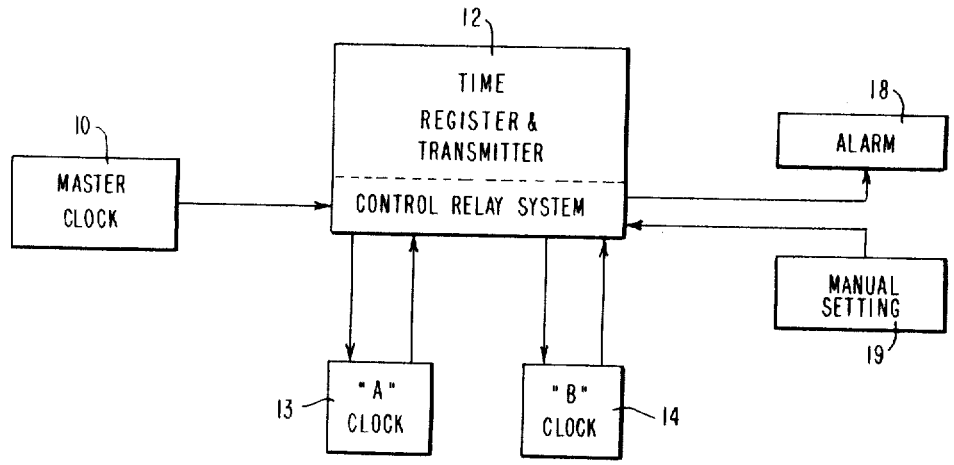
Figure 1A:
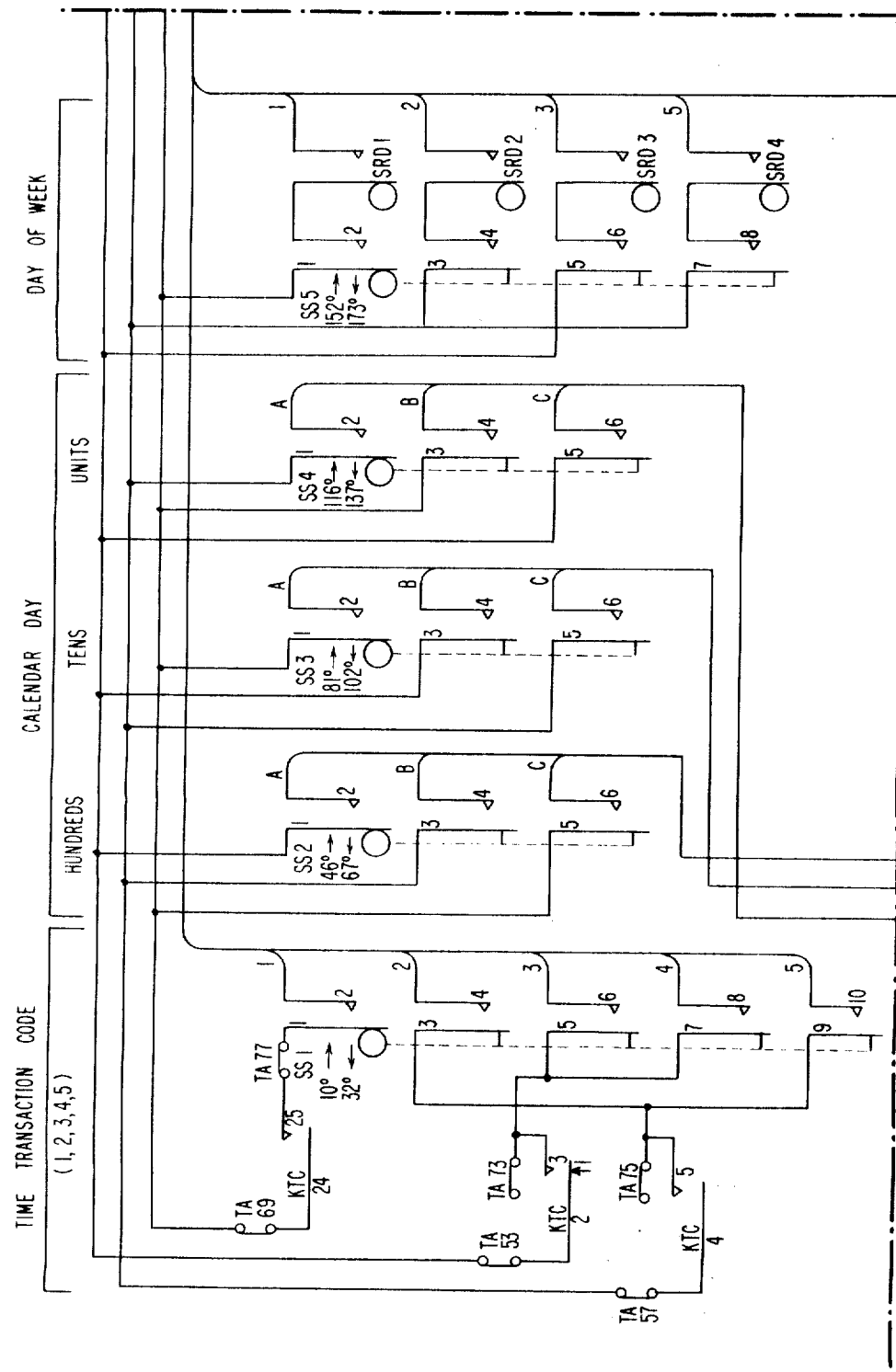
Figure 1B:
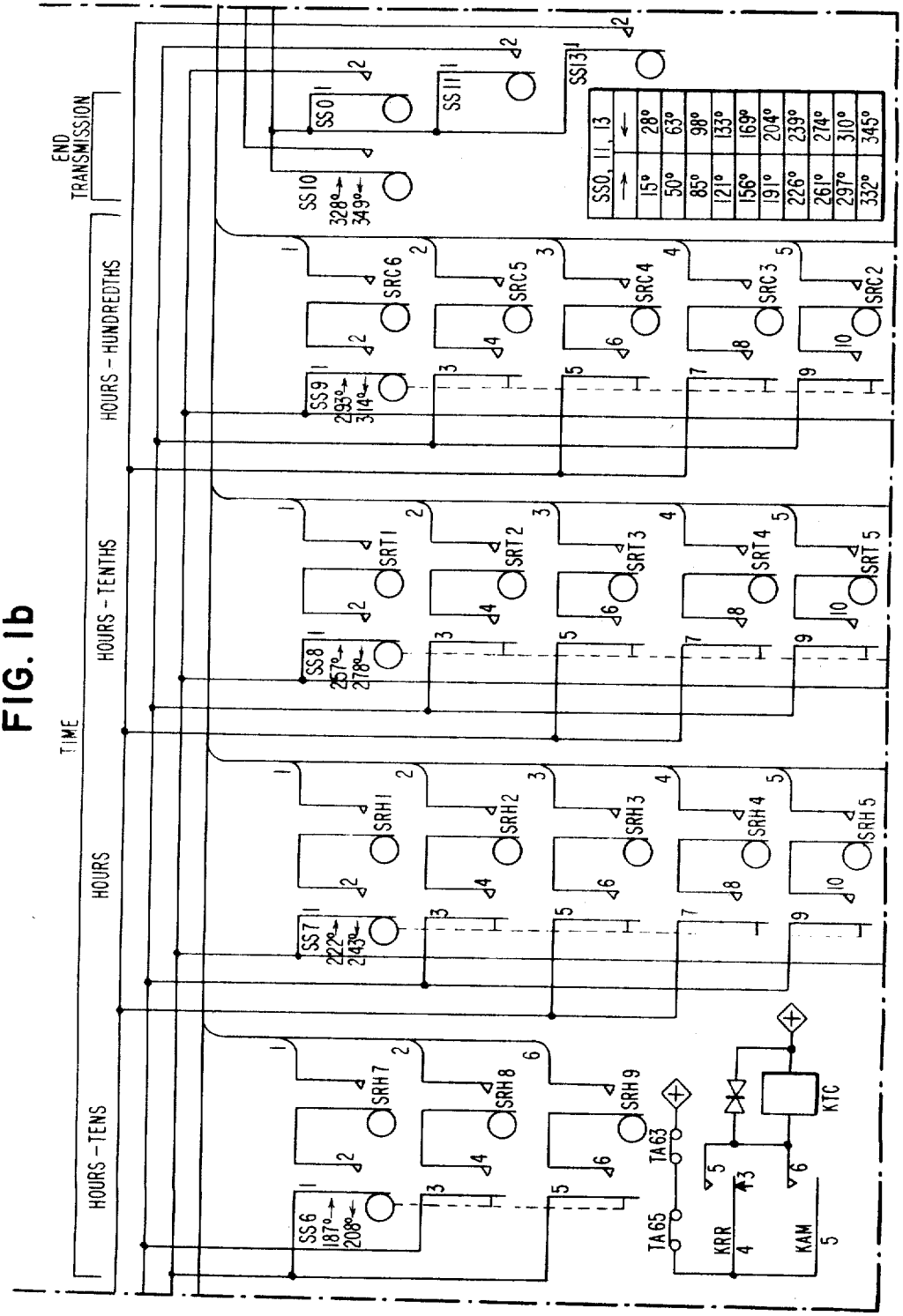

The present invention relates to time clock or time register synchronizing systems for maintaining correspondence between the prevailing time registered by the clock or register and that of a master clock. More particularly, the invention relates to synchronizing systems in which correspondence between the clock or register time is periodically compared to that of a master clock and any comparative time deviation which may prevail is corrected by automatically resetting the time clock or register to the prevailing time of the master clock.

Master clock systems are widely used to control and synchronize the operations of remotely situated and often scattered time devices such as wall clocks, time stamps, and the like. A master clock of the system serves as an accurate time standard, and generates and transmits electrical signals. Certain of these signals may directly advance at minute, hour, and day intervals the time recorded by accumulators generally of the time stamp type. Others of the electrical signals may provide periodic synchronization of self-operating time devices, for example at hourly intervals, by correcting the latter for any slow or fast time deviations occurring within the corrective interval.

Master clock systems conventionally record time in hours and minutes, and transmit a synchronizing signal at the start of a preselected minute within the hour. The synchronizing signal may be readily used to synchronize the operation of a time device which also records time in hours and minutes, but difficulty arises when it is desired that the synchronizing signal synchronize and correct the operation of a time clock or register which records time in decimal fractions of an hour. Such a time register is utilized in a time transmitter of the data transmission system disclosed in the copending application of applicant and another, Serial No. 254,896, filed January 30, 1963, now United States patent No. 3,309,673, granted March 14, 1967, and assigned to the same assignee as the present application. In this time transmitter, it is desired that the prevailing time registered by the time register of the transmitter be transmitted for recording as a succession of coded digits giving the prevailing time expressed in the Continental system to the nearest hundredth of an hour. While time expressed in hundreths of an hour coincides with every third minute of time expressed in hours and minutes, various master clock systems use various minutes within the hour for transmission of their synchronizing signal. It accordingly has not heretofore been readily convenient, and in fact has generally not been feasible, to synchronize time registers of the hundredths-hour type by use of any and all of the various synchronizing signals supplied by the numerous available master clock systems currently in widespread use.

It is an object of the present invention to provide a new and improved system for synchronizing a self-operational time clock or register from any of numerous available master time clocks.

It is a further object of the invention to provide a novel system for maintaining the operation of a self-operational time register synchronized with that of any of numerous available master time clocks including automatic periodic correction of the time recorded by the time register as required to maintain it in agreement with that of the master clock.

It is an additional object of the invention to provide an improved synchronizing system for synchronizing and correcting a time clock or register which records time in decimal notation to the nearest one hundredth of an hour from a master clock which records time in hours and minutes.

It is yet a further object of the invention to provide a synchronizing system which by means of one simple and readily effected setting of a timing component enables synchronization and correction of a time register of the hundredths hour type by use of a synchronizing signal transmitted by a master clock at the beginning of any given minute within the hour, and thus one which enables synchronization of such time register by use of any and all of the various synchronizing signals supplied by numerous of the available master clock systems currently in widespread usage.

Figure 2:
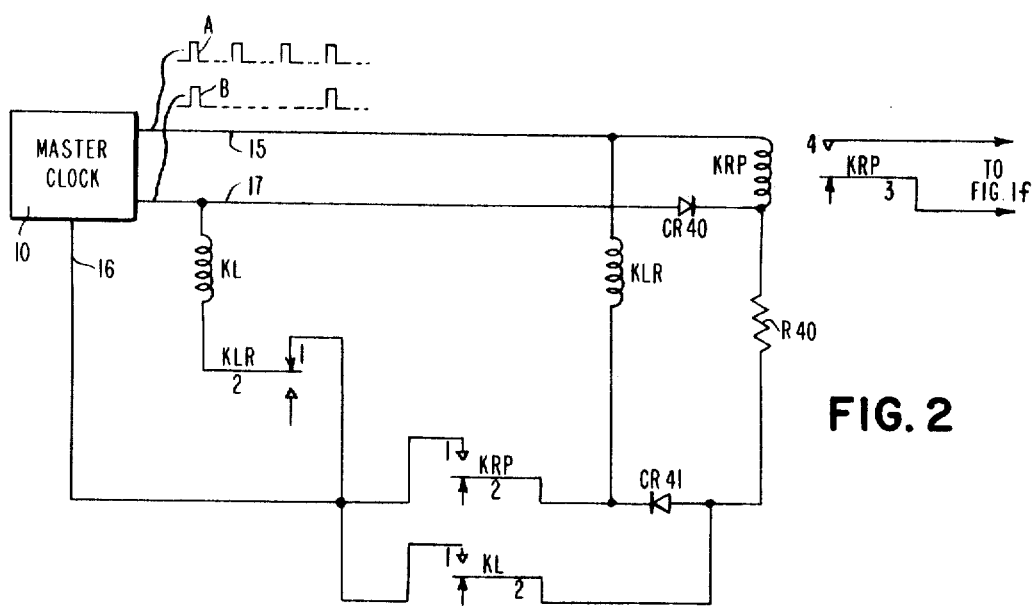
Figure 3:
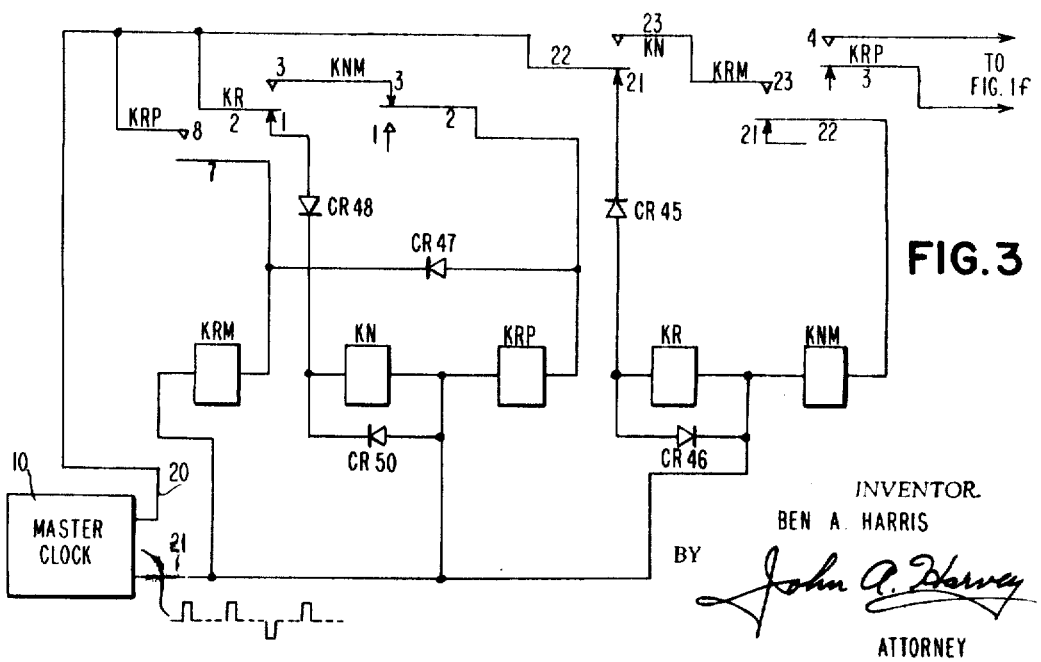
Figure 4:
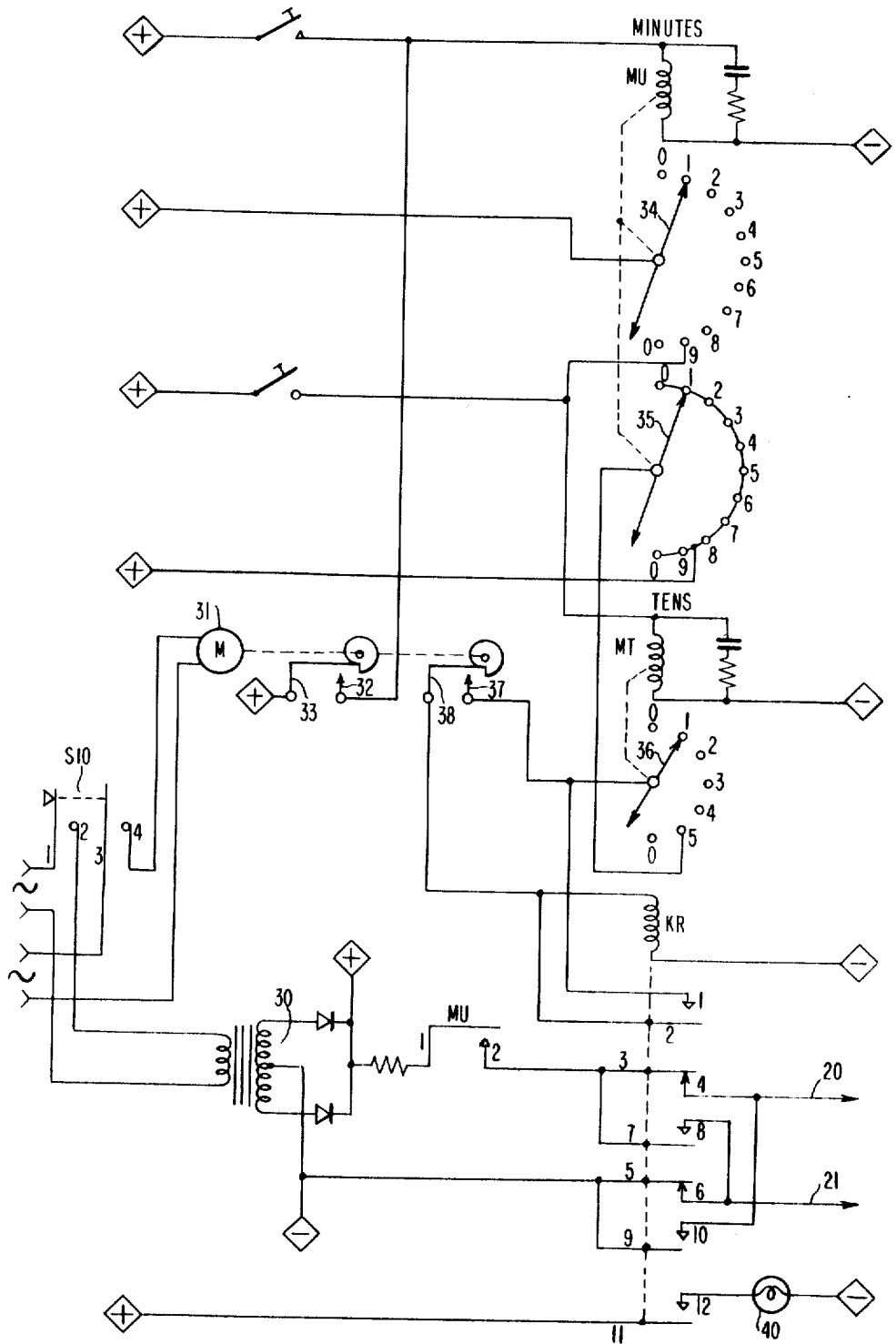

Other objects and advantages of the invention will appear as the detailed description thereof proceeds in the light of the drawings forming a part of this application, and in which:

FIG. 1 schematically shows in block diagram the arrangement of a time synchronizing system embodying the present invention in a particular form more fully described hereinafter;

FIGS. 1a–1h arranged as in FIG. 1a to show the electrical circuit arrangement of a time transmitter embodying the synchronizing system of the present invention in a form suitable for synchronizing and correcting the operation of a time register of the hundredths hour type from various forms of master clocks;

FIG. 2 is an electrical circuit diagram of a unit suitable for enabling synchronization control of the FIG. 1 synchronizing system from one form of master clock, and FIG. 3 is an electrical circuit diagram of a unit enabling synchronization control of the FIG. 1 synchronizing system from a master clock of a different form from that used with the FIG. 2 arrangement; and FIG. 4 is a circuit diagram of a simple form of master clock useful with the FIG. 3 unit.

Referring now more particularly to FIG. 1 which schematically shows a time synchronizing system embodying the present invention and which is adapted to be synchronized hourly by a master clock 10, the system as hereinafter particularly described by way of example includes a time register and transmitter unit 12 with an associated control relay system as indicated. The master clock 10 records time in hours and minutes, whereas the time register of the unit 12 records time to the nearest hundredth of an hour and thus must be synchronized at the start of a particular hundredth of the hour rather than at a particular minute within the hour.

The synchronizing system includes an "A" clock 13 which normally operates the time register of the unit 12 between hourly synchronizing or corrective intervals, and includes a "B" clock 14 which initiates time synchronization and effects time correction of the register in dependence upon the preselected minute within the hour at which the master clock 10 transmits its synchronizing signal electrical pulse. The control relay system of the unit 12 so controls the "B" clock 14 that the latter normally begins a four-cycle period of operation upon transmission of the master clock synchronizing pulse signal. The "B" clock includes a pair of electrical contacts (contacts SCS3–B hereinafter described) which are angularly preset to provide a preselected time delay interval beginning with the start of the operation of the "B" clock and before a corrective interval is initiated. The value of this delay is preset according to the particular minute within the hour at which the master clock 10 transmits its synchronizing signal pulse. The control relay system of the unit 12 includes certain relay controls to detect when the time in tenths and hundredths of an hour recorded by the time register has reached a value which is conveniently called the time synchronous value. The latter is indicative, in relation to the designated minute in the hour at which the time synchronizing pulse of the master clock 10 emanates, of whether the time register is correct or conversely is either fast or slow. Determination that the time register is fast, and its correction if slow, centers around operation of the "B" clock 14.

The control relay system of the unit 12 halts operation of the "A" clock 13, at the end of an operating cycle of the later, after initiation of operation of the "B" clock. If the time register of the unit 12 reaches the synchronous value and there has been no synchronizing pulse signal received from the master clock 10, it is assumed that the latter is inoperative so that the "B" clock 14 does not begin operation and advance of the time register continues without interruption under control of the "A" clock. This character of operation causes an alarm unit 18 to provide a visual and audible alarm calling attention of the operator to the possible need of a manual correction of the time register setting by use of a manual setting unit 19. If the synchronizing signal pulse of the master clock 10 is received to initiate operation of the "B" clock 14 and if the time register of the unit 12 reaches the time synchronizing value upon the second time advance of the "B" clock, it is known that the time register is correct. The latter accordingly is advanced once more by the "B" clock, and the control relay system thereupon initiates resumed operation of the "A" clock to restore the control of the latter over the normal time advances of the time register. For this character of operation, the "B" clock continues to operate to completion of its full cycle at which time it halts. If the time synchronizing value of the time register of the unit 12 should not be reached by the time register upon the second advance effected by the "B" clock, it is known that the time register is slow and accordingly it is then continuously advanced until it records the time synchronizing value. For this character of operation the "B" clock then once more advances the time register and the control relay system then initiates operation of the "A" clock and returns control of further time advances to the latter as last described.

FIGS. 1a–1h arranged as FIG. 1a shows the electrical circuit arrangement of a time transmitter embodying the synchronizing system of the present invention in a form suitable for synchronizing and correcting the operation of a time register of the one hundredths-hour type from any of various available master clocks. The time clock or register of the time transmitter has a physical construction as disclosed in the copending Stiffler application Ser. No. 249,201, filed January 3, 1963, now United States Patent No. 3,205,651, granted Sept. 14, 1965, and assigned to the same assignee as the present application, and operates in the time transmitter to effect time transmissions essentially as described more particularly in connection with FIG. 13 of the aforementioned Patent No. 3,309,673. Briefly considered for purposes of the present application, the time register includes a synchronous drive motor M and a hundredths-hour time shaft which is periodically coupled to the drive motor M under control of a synchronous clock (hereinafter referred to as the "A" synchronous clock) to be periodically advanced by one-tenth shaft revolution every thirty-six seconds (one-hundredth hour). This one hundredth-hour time shaft operates cam-actuated contacts SRC1–SRC6 (FIGS. 1b and 1e) which provide an electrically coded digit indicative of the prevailing one hundredths hour recorded by the register. This time shaft is provided with a one-tooth gear which upon each complete shaft revolution engages and moves by one-tooth width a full gear provided on a tenths-hour time shaft. The latter operates cam-actuated contacts SRT1–SRT6, which provide an electrically coded digit indicative of the prevailing tenths-hour recorded by the register. Upon each full revolution of the tenths-hour shaft, a one-tooth gear carried by this shaft engages and moves by one-tooth width a full gear carried by an hour time shaft of the register. The hour time shaft operates cam-actuated contacts SRH1–SRH9 to provide an electrically coded digit indicative of the prevailing hour (as expressed in the twenty-four Continential system) recorded by the register.

The hour time shaft also operates cam-actuated contacts SRH10–SRH17 (FIG. 1h) which with tenths-hour time shaft operated cam-actuated contacts SRT10–SRT17 are used to control an automatic attendance mode of system operation, in a manner presently to be explained, when the present time transmitter is used in the data transmission system of the aforementioned Patent No. 3,309,673. The hours time shaft also operates cam-actuated contacts SRH8 (FIG. 1g) which are used to control of a calendar day-of-the-year register portion in a manner presently to be explained. The hours time shaft is provided with a one-tooth gear which, upon each complete revolution of the hours shaft, engages and moves by one-tooth width a full gear provided on a day-of-the-week time shaft which operates cam-actuated contacts SRD1–SRD4 to provide an electrically coded digit indicating the numeric day of the week.

The calendar day-of-the-year register portion includes a units stepping switch having an electromagnet SCU with normally-open SCU interrupter contacts 2 and 3 and normally-closed off-normal contacts 4 and 5 and normally-open off-normal contacts 2 and 3 together with three decks of stepping switch contacts identified as SCU decks A, B and C. This portion of the register also includes a tens stepping switch including a stepping magnet SCT with normally-open SCT interrupter contacts 2 and 3, normally-closed off-normal contacts 4 and 5 and normally-open off-normal contacts 2 and 3 together with three decks of stepping switch contacts identified as SCT decks A, B and C. This register portion additionally includes a hundreds stepping switch having an operating magnet SCH with normally-open SCH interrupter contacts 2 and 3 together with three decks of stepping switch contacts identified as SCH decks A, B and C. These three stepping switches are energized in a manner next to be explained to provide an electrically coded three-digit number having units, tens and hundreds digits identifying the day of the year.

The hour time shaft operated cam-actuated contacts SRH8 normally open contacts 3 and 4 (FIG. 1g) close at eight o'clock p.m. (twenty hours in the Continental system) and open at midnight. These contacts upon closing energize a relay KPCA through a circuit which includes the normally closed contacts 4 and 5 of an advance hundredths switch SH, the normally closed contacts 4 and 5 of an advance tens switch ST, the normally closed contacts 4 and 5 of an advance units switch SU, and the now closed contacts 5 and 6 of a power monitor relay KPM which is initially energized (FIG. 1h) upon manual actuation of a reset switch S3 to close its normally-open contacts 1 and 2 and which thereafter remains energized through the now closed contacts 1 and 2 of the relay KPM (the contacts 21 and 22 of the latter opening to extinguish a "Power Failure" indicator lamp L1). When the hour cam-actuated contacts SRH8 open at midnight, the now closed contacts 2 and 3 of the relay KPCA cause a relay KCA to be energized in series with the relay KPCA. The now closed contacts 21 and 22 of the relay KCA energize the units stepping switch magnet SCU through the normally closed contacts 1 and 2 of the advance units switch SU. This stepping switch thereupon closes its normally-open SCU interrupter contacts 2 and 3 which complete an electrical circuit, through the SCU off-normal normally-closed contacts 4 and 5, in shunt to the relay KCPA to deenergize the latter and by opening of the contacts 2 and 3 of the relay KPCA concurrently to deenergize the relay KCA. The contacts 21 and 22 of the relay KCA open to deenergize the stepping switch magnet SCU which thereupon causes the stepping switch to take a step and advance the setting of its A, B and C deck switch contacts. Successive closures of the SRH8 contacts on successive days cause the units stepping switch to take successive steps. When the units stepping switch takes its ninth step, its normally-closed off-normal contacts 4 and 5 open and its normally-open off-normal contacts 2 and 3 close. Upon the next energization of the relay KCA, the units stepping switch magnet SCU is energized as before and the tens stepping switch magnet SCT is now energized through the advance tens switch ST normally-closed contacts 1 and 2, the now closed contacts 2 and 3 of the off-normal units stepping switch, and the now closed contacts 23 and 24 of relay KCA. The relay KPCA is thereupon deenergized by the previously described shunting circuit but which now includes the normally-closed contacts 4 and 5 of the tens off-normal stepping switch SCT, the now closed tens stepping switch interrupter contacts 2 and 3, and the now closed units interrupter stepping switch contacts 2 and 3. Deenergization of the relay KPCA in turn effects deenergiaztion of the relay KCA and the units and tens stepping switches are caused to take a step. Successive complete revolutions of the units stepping switch cause the tens stepping switch to take successive steps. When the tens stepping switch takes its ninth step, its off-normal contacts 4 and 5 open and its off-normal contacts 2 and 3 close. Upon the next energization of the relay KCA, the units and tens stepping switch magnets SCU and SCT are energized as before and the hundreds stepping switch magnet SCH is energized through the normally closed contacts 1 and 2 of the advance hundreds switch SH, the now closed off-normal contacts 2 and 3 of the tens stepping switch, the now closed contacts 25 and 26 of the relay KCA, the now closed units stepping switch off-normal contacts 2 and 3, and the now closed contacts 23 and 24 of the relay KCA. The shunt deenergizing circuit for the relay KPCA now includes the hundreds stepping switch now closed interrupter contacts 2 and 3, the tens stepping switch now closed interrupter contacts 2 and 3, and the units stepping switch now closed interrupter contacts 2 and 3. The resultant deenergization of the relay KPCA effects deenergiaztion of the relay KCA as before, and this causes the units, tens, and hundreds stepping switches to take a step. Thus the calendar day portion of the register accumulates a count of the days of the year to the 364th or 365th day at which time it is manually reset to begin a count of the days of the next year.

Figure 1D:
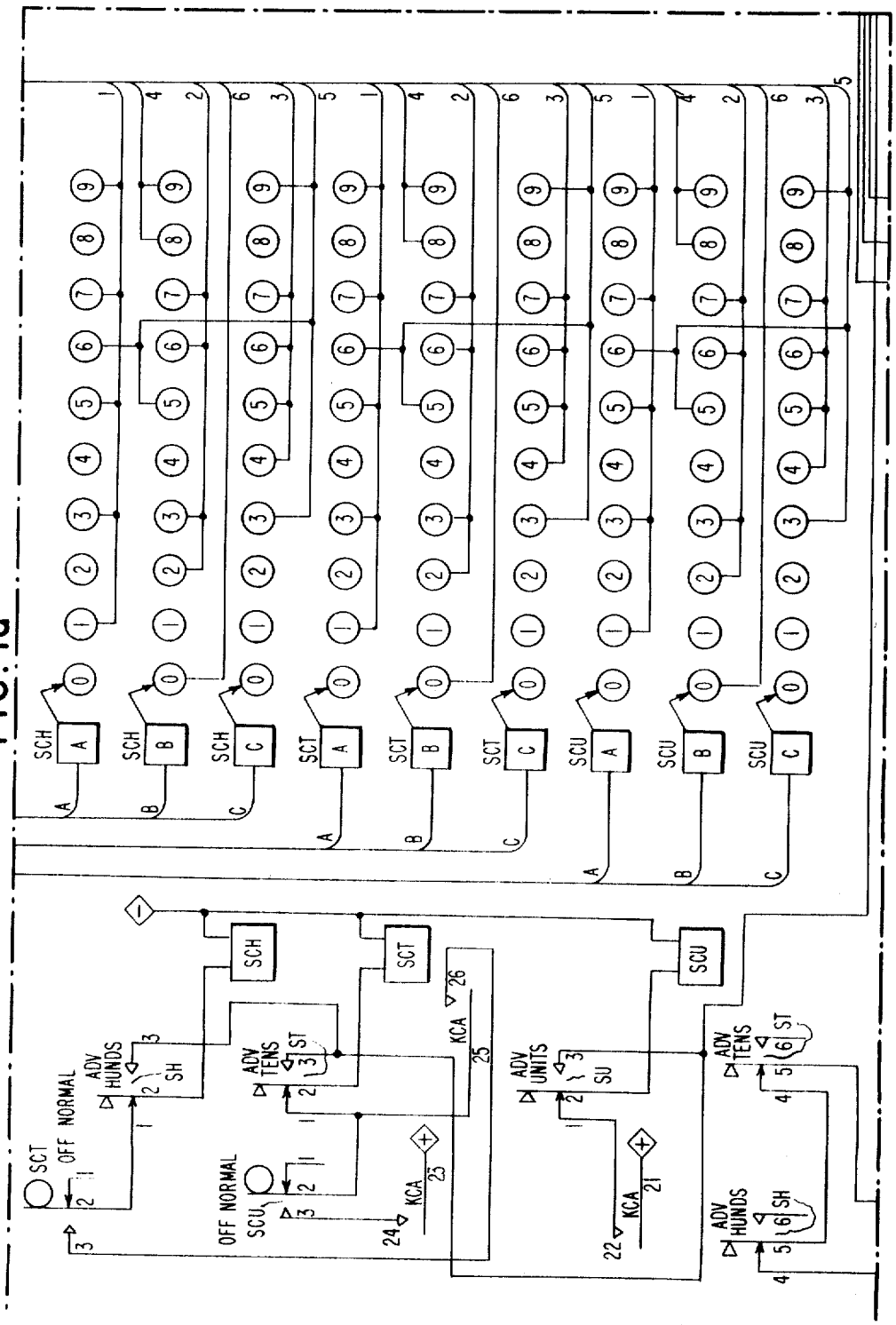

This manual reset of the calendar day stepping switches is accomplished by manually operating a halt switch S1 (FIG. 1f) to close its contacts 2 and 3 and energize a stop timer relay KST. As will presently be explained more fully, the time register is normally advanced at each 100 hour under control of an "A" synchronous clock. The latter is energized from a suitable alternating current source through the normally closed contacts 1 and 2 (FIG. 1e) of cam-actuated contacts SCS2–A of this clock, which contacts are normally shorted by a series circuit which includes the normally closed contacts 27 and 28 of a motor prime relay KMP and the normally closed contacts 24 and 25 of the stop timer relay KST. Upon energization of the stop timer relay KST at last mentioned, the "A" synchronous clock motor continues to operate until the contacts 1 and 2 of its cam-actuated contacts SCS2–A open at which time the contacts 3 and 4 (FIG. 1f) of is cam-actuated contacts SCS2–A close. This applies positive potential from the latter contacts through normally-closed contacts 1 and 2 of a motor prime relay KMP and the now closed contacts 5 and 6 of the manually actuated halt switch S1 to energize a halt relay KHLT (which then remains energized through its normally-open contacts 9 and 10 and opens its contacts 28 and 29 to deenergize a "clock-on" indicator lamp L2) and to energize the No. 3 contacts of the advance units switch SU, the advance tens switch ST, and the advance hundreds switch SH. Repetitive manual actuation of the advance units switch SU repetitively to close its contacts 2 and 3 repetitively energizes the units stepping switch magnet SCU to set the units stepping switch to its first position corresponding to the first day of the new year. Repetitive manual actuation of the advance tens switch ST repetitively to close its contacts 2 and 3 repetitively energizes the tens stepping switch magnet SCT to set the tens stepping switch to its zero position. And repetitive manual actuation of the advance hundreds switch SH repetitively to close its contacts 2 and 3 repetitively energizes the hundreds stepping switch magnet SCH to step the hundreds stepping switch to its zero position. These setting operations prepare these stepping switches to begin the count of the calendar days in the new year. The halt switch S1 is then manually released to deenergize the stop timer relay KST, and the now closed contacts 24, 25 of the latter again energize the "A" synchronous clock to continue normal time advances of the time register as soon as the halt relay KHLT becomes deenergized some seconds later when the contacts 3 and 4 of the clock cam-actuated contact set SCS2–A open. If the time register has lost one or two normal time advances during the setting of the clandear day stepping switches, the setting of the time register will be automatically corrected by an hourly synchronizing operation hereinafter described. The contacts in the three contact decks of each stepping switch are electrically interconnected as shown in FIG. 1d to provide for each stepping switch an electrically coded digit representing the prevailing values of the units, tens and hundreds calendar day counted by the stepping switches.

The prevailing calendar day is visually indicated by numeric indicating tubes NRU, NRT and NRH having electrodes energized as shown by D deck switch contacts provided on the units, tens and hundreds stepping switches. These indicating tubes may conveniently be of the type supplied under the trademark Nixie by the Burroughs Corporation of New York, N.Y.

When the time transmitter of FIG. 1 is used as a component of the data transmission system disclosed in the aforementioned Patent No. 3,309,673, the time transmitter is connected to the data receiver-recorder of the system to supply upon demand of the receiver-recorder the value of prevailing time registered by the time register of the transmitter. The time transmitter signifies its readiness to make time transmissions by energization of an output circuit conductor JLW from a receiver-energized input conductor JLe through normally-open contacts 3 and 4 of the power monitor relay KPM, which is normally maintained energized to close its contacts 3 and 4 as previously explained. The receiver includes a relay (KR0) which is receiver-controlled to be energized during a data mode character of system operation from an output circuit terminal JLY of the time transmitter by positive energization supplied through normally-closed contacts 21 and 22 of an attendance mode relay KAM, normally-closed contacts 21 and 22 of a delay relay KD2, normally-closed contacts 1 and 2 of the halt relay KHLT, normally-closed contacts 1 and 2 of the "A" synchronous clock cam-actuated contact set SCS1–A, normally-closed contacts 4 and 5 of a relay KMP, and normally-closed contacts 7 and 8 of a serializer cam-actuated contact SS15 to the energized input conductor JLe. Upon energization of the receiver relay KR0 in preparation to receive a time transmission, an input terminal JLZ of the transmitter is energized from a positively energized output terminal JLb of the time transmitter. Energization of the input terminal JLZ effects energization of a serializer read-out clutch LR0 through normally-closed contacts 3 and 4 of serializer cam-actuated contacts SS15 which are closed from 349° of one serializer cycle to 11° of the next serializer cycle. The serializer has a construction disclosed in the copending application of Edwin O. Blodgett, Ser. No. 725,490, filed Jan. 30, 1963, and assigned to the same assignee as the present application.

This serializer has a motor drive source, and upon the energization of the serializer clutch magnet LR0 begins a cycle of operation and serializer cam-actuated contacts SS17 close to supply the energization of the input conductor JLe to the output conductor JLX which holds the receiver relay KR0. The serializer completes its cycle of operation during which normally-open serializer cam-actuated contact stacks SS1–SS9 close their associated sets of normally-open contacts successively in order from the stack SS1 to the stack SS9 and during successive cyclic angular portions of the serializer cycle which correspond to successive concurrent closures of serializer cam-actuated contacts SS0, SS11 and SS13 as indicated by the tabulation shown in association with the latter contacts. The serializer contacts SS0, SS11 and SS13 are energized by the positively energized input circuit JLe of the transmitter, and in turn apply energization to the contacts of the serializer contact stacks SS1–SS9 as shown, whereby the successively closing serializer contact stacks SS1–SS9 energize output circuits of the transmitter JLn, JLm, JLp, JLk, JLj and JLh according to the prevailing closed and open circuit status of the hundreds hour digit coding contacts SRC1–SRC6, the tenths hour coding contacts SRT1–SRT6, the hours coding contacts SRH1–SRH9, the day-of-week coding contacts SRD1–SRD4, the calendar day units stepping switch deck contact settings, the calendar day tens stepping switch deck contact settings, the calendar day hundreds deck contact settings, and (if the system is in attendance mode) to transmit a time transaction code digit (1, 2, 3, 4, 5). The successive coded digits thus transmitted to the data receiver are recorded by the latter. At the end of the time transmission, an output circuit conductor JLc is energized by closure of serializer contacts SS10 between 328° and 349° to transmit an "end of transmission" signal to the receiver signifying that the time transmission has been completed.

Figure 1E:
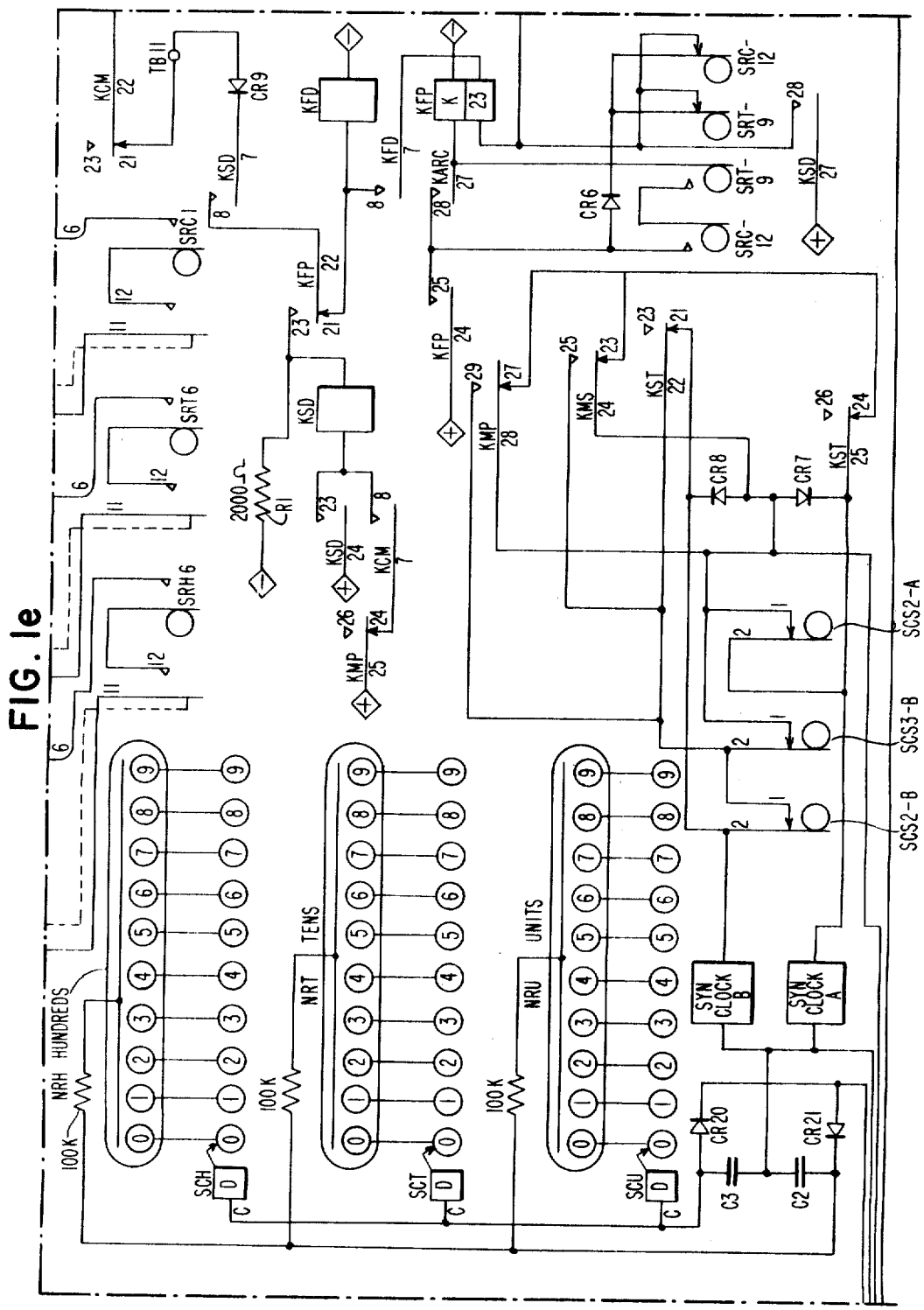
Figure 1F:
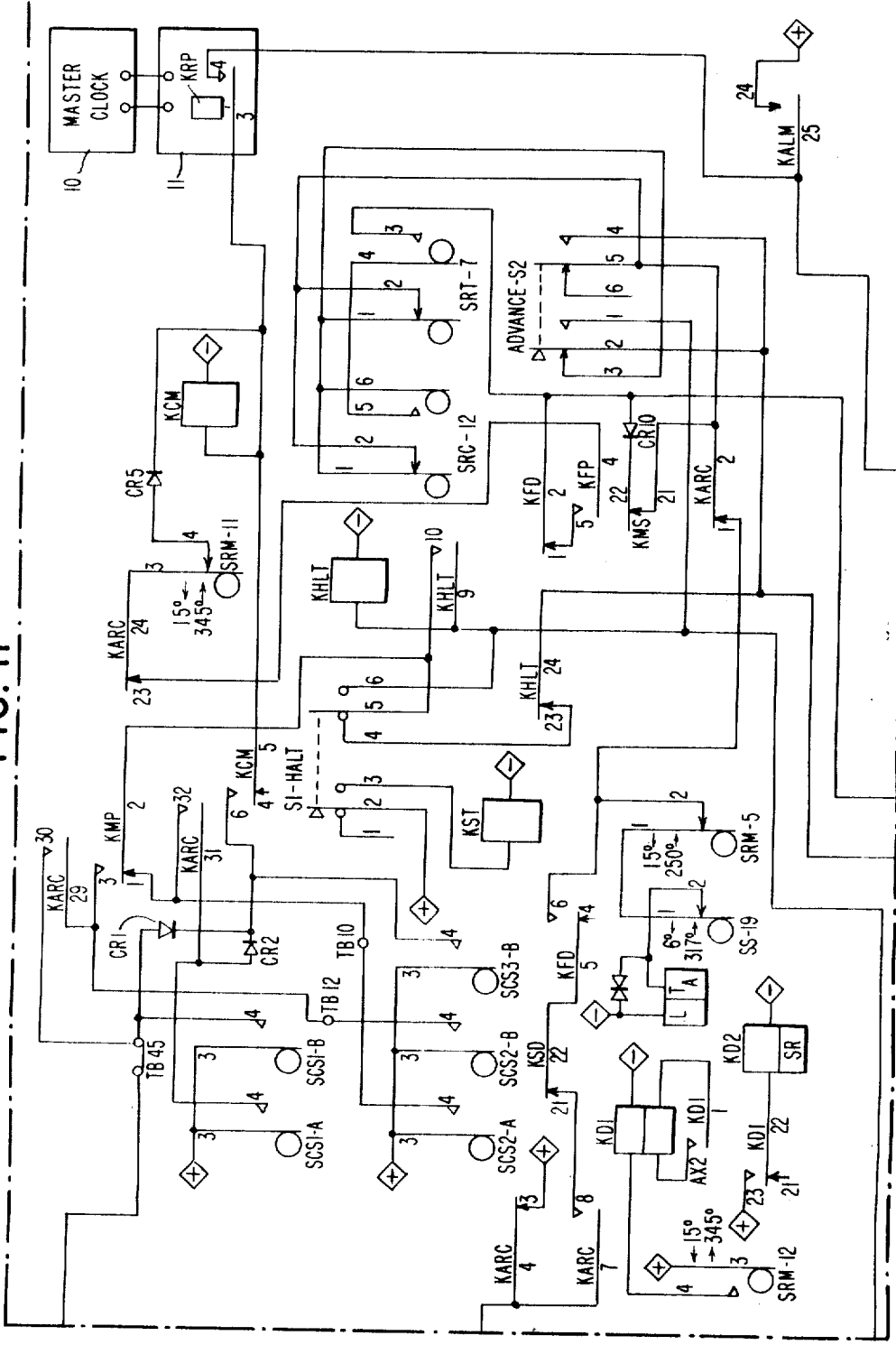
Figure 1G:
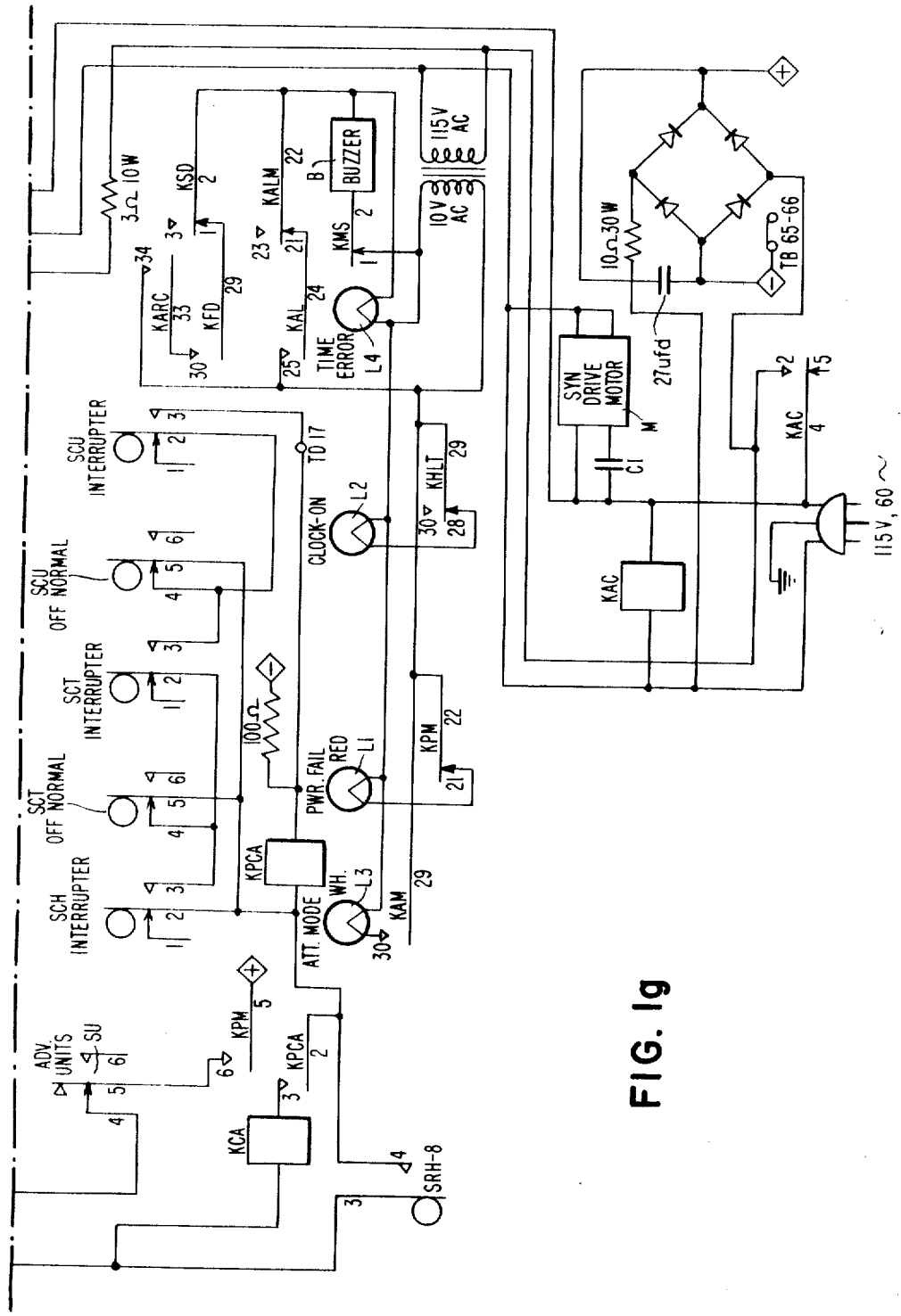
Figure 1H:
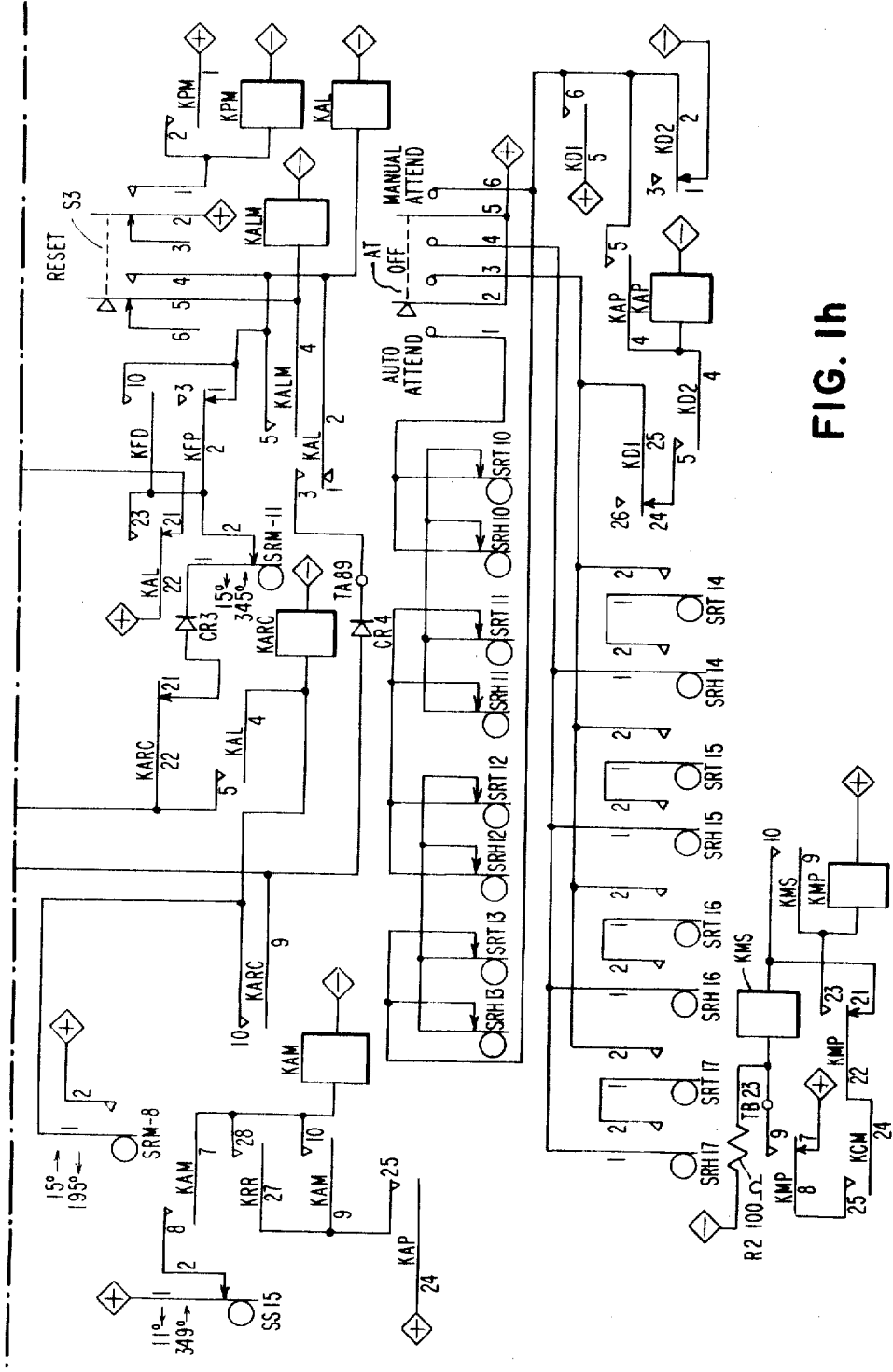

The data transmission system of the aforementioned Patent No. 3,309,673 may be controlled to operate either in a data transmission mode, for transmission of data information to the central receiver for recording, or in an attendance mode permitting the transmission to the receiver of only employee-identifying data read from identification badges. Change of the system operation from the data transmission mode to the attendance mode is accomplished at the time transmitter under control of the manual setting of an attendance switch AT (FIG. 1h). The latter is a three-position switch and remains in any of three positions to which it is manually set. In a neutral position of the switch AT, the operation of the data transmission system remains at all times in the data transmission mode; an automatic attendance mode setting of the switch AT automatically changes the system operation from the data mode to the attendance mode and vice-versa at the beginning and end of preselected time intervals during a twenty-four hour daily period; and, lastly, the third position of the switch AT manually places the system in the attendance mode in which it remains until manually taken out of the attendance mode. The time transmitter operation prevailing when the switch AT is set to the manual attendance position will first be considered, and this will be followed by a consideration of the changed character of the time transmitter operation when the switch AT is manually set to the automatic attendance position.

Each time the time register is advanced at a hundredth hour interval in a manner presently to be described, the resultant full revolution of the time register main drive shaft closes normally open contacts 3 and 4 of cam-actuated contacts SRM12 (FIG. 1f) to energize a delayed-actuated release relay KD1. A delayed-release relay KD2 is thereupon energized through the now closed contacts 22 and 23 of the relay KD1. At 345° of the time register main drive shaft, the contacts 3 and 4 of the cam-actuated contact set SRM–12 open to deenergize the delayed-release relay KD1. The opening of the contacts of the latter is delayed, however, by previous closure of the contacts 1 and 2 of the relay KD1 (these contacts closing first and opening last with respect other contacts of this relay) which complete the circuit of a winding on the relay KD1 effective to oppose a rapid decrease of the energizing magnetic flux established during energization of the relay. Accordingly, the contacts 22 and 23 of the relay KD1 are delayed in opening for approximately fifteen milliseconds to effect deenergization of the relay KD2 which also is of the slow-release type and does not open its contacts until approximately twenty-five to thirty milliseconds after the relay becomes deenergized. With the attendance mode switch AT operated to the manual attendance position to close its contacts 2 and 3, a relay KAP (FIG. 1h) becomes energized upon delayed closure of the contacts 24 and 25 of the relay KD1 and during delayed opening of the contacts 4 and 5 of the relay KD2. The relay KAP is thereafter maintained energized through its now closed contacts 4 and 5 and the now closed contacts 5 and 6 of the attendance mode switch AT.

A relay KTS (FIG. 1c) is now energized through the normally-closed contacts 5 and 6 of the serializer cam-actuated contacts SS15 which are closed when the serializer is at rest, the normally-closed contacts 21 and 22 of the halt relay KHLT (which prevent placing of the system in the attendance mode of operation during periods of time register halt by the previously described manual actuation of the halt switch S1), the normally-closed contacts 1 and 2 of an attendance mode relay KAM, and the now closed contacts 2 and 3 of the relay KAP. The relay KTS remains energized through the contacts 5 and 6 of the serializer cam-actuated contacts SS15 and its own closed contacts 7 and 8. The contacts 27 and 28 of the relay KTS (FIG. 1c) close to apply the positive receiver energization of the line conductor JLe to a line conductor JLT which extends to the receiver to effect energization of a relay KCT therein and which in the attendance mode of system operation effects energization of the receiver relay KR0 whereby the data input lines of the receiver are connected to the output lines JLh, JLj, JLk, JLm, JLn and JLp of the time transmitter.

Now closed contacts 2 and 3 (FIG. 1c) of the relay KTS energize one winding of a relay KRR. If transmission-in-progress relays (KSI or KMLC) of the data receiver are energized at this time to indicate that a data transmission is in progress, the receiver receives energization through an output conductor JLf extending from the relay KTS energizing circuit last mentioned and applies this energization to an input line conductor JLd. The energization of the conductor JLd is applied through the now closed contacts 5 and 6 of a relay KARC (the latter being energized at this time in a manner presently to be explained and by reason of the time register time advance which accomplished the earlier described energization and deenergization of the delay relays KD1 and KD2), the now closed contacts 29 and 30 of the relay KTS, and the normally-closed contacts 21 and 22 of the relay KRR to a reverse energizing circuit of the relay KRR. Accordingly, the relay KRR does not become energized until its reverse energization is removed by reason of the deenergization of both of the receiver transmission-in-progress relays (KSI and KMLC). It was previously explained that the receiver demand for a time transmission depended upon energization of a receiver relay KR0 through the line conductor JLY. For the attendance mode, however, the previously described energization of the receiver relay KCT requires that the receiver relay KR0 be now energized through a line conductor JLV. This occurs when the relay KRR closes its contacts 9 and 10 (the parallel-connected contacts 4 and 5 of the relay KTS being open at this time) and as soon as the time register main drive shaft cam-actuated 1 and 2 contacts SRM12 close at 345° of the main drive shaft revolution, at which time energization from the receiver energized line JLe is applied through the now closed contacts 7 and 8 of the serializer cam-actuated contacts SS15, the time register cam-actuated contacts SRM12, the now closed contacts 13 and 14 of the relay KARC, the normally-closed contacts 21 and 22 of a relay KFD, the normally-closed contacts 1 and 2 of the halt relay KHLT, and the normally-closed contacts 21 and 22 of the delay relay KD2 and the now closed contacts 9 and 10 of the relay KRR to the conductor JLV. The contacts 27 and 28 (FIG. 1h) of the relay KRR close to energize the attendance mode relay KAM through the now closed contacts 24 and 25 of the relay KAP, the relay KAM thereafter remaining energized both (1) through its now closed contacts 7 and 8 and contacts 1 and 2 of the serializer cam-actuated contacts SS15 and (2) its now closed contacts 9 and 10 and the now closed contacts 24 and 25 of the relay KAP. At the time relay KRR was energized as previously described, the contacts 4 and 5 (FIG. 1h) of this relay energize a transaction code relay KTC and this relay remains energized during the period of energization of the attendance mode relay KAM to close the contacts 5 and 6 of the latter. The contacts 29 and 30 (FIG. 1g) of the attendance mode relay KAM close to energize an attendance mode indicator lamp L3 to indicate change-over of the system operation to the attendance mode. The contacts 22 and 23 (FIG. 1c) of the attendance mode relay KAM close to energize the circuit conductor JLY from the receiver energized circuit conductor JLe, the energized conductor JLY now providing in the attendance mode an energization utilized in the receiver for energizing the relay KR0 thereof. The contacts 27 and 28 of the relay KAM close to apply energization from the conductor JLe to a line conductor JLa which extends to the receiver and energizes a relay (KCM) therein, this receiver relay effecting change of the data transmission system to the attendance mode of operation wherein operation of identification badge readers only is permitted for data transmission. The now energized receiver relays (especially KCT and KR0) complete a circuit in the receiver from a transmitter energized line conductor JLb to a transmitter input line conductor JLZ to energize the serializer clutch magnet LR0 through the normally-closed contacts 3 and 4 of the serializer cam-actuated contacts SS15.

As the serializer begins a cycle of operation upon this energization of the serializer clutch magnet LR0, the contacts 5 and 6 of the serializer cam-actuated contacts SS15 open at 11° of the serializer cycle to interrupt the energizing circuit of the relay KTS. The relay KRR was maintained energized previous to this time through the closed contacts 2 and 3 of the relay KTS, but upon deenergization of the latter further energization for the relay KRR is maintained through its now closed contacts 25 and 26 and the now closed contacts 3 and 4 of the serializer cam-actuated contacts SS17 to 351° of the serializer cycle at which point these contacts open to deenergize the relay KRR. The now closed contacts 2–5 and 24–25 (FIG. 1a) of the relay KTC energize the serializer cam-actuated contacts SS1 to transmit the time transaction code 1–2–3–4–5. Thereafter the serializer in continuing its cycle of operation transmits the calendar day of the year, the day of the week, and the time in hours to the nearest one-hundredth hour and an end of transmission signal is thereafter transmitted by energization of the line conductor JLc as previously explained.

Each subsequent change of time after the system is placed in the attendance mode effects a time transmission by energization of the delay relays KD1 and KD2 and resultant energization of the relay KTS (and with it the relay KRR) through the now closed contacts 2 and 3 of the relay KAP, the normally-closed contacts 21 and 22 of the relay KHLT, and the normally-closed contacts 5 and 6 of the serializer cam-actuated contacts SS15. Removal of the jumper connection between the terminal TA45 and the terminal TA43 (FIG. 1c) and the connection of the terminals TA45 and TA41 causes a time transmission to be made upon each tenth one-hundred hour time change (i.e. each sixth minute interval) of the time register when the contacts 1 and 2 of the hundredths hour cam-actuated contacts SRC–17 close.

Assume now that the attendance mode switch AT is moved to its OFF or neutral position to open its contact pairs 2 and 3 and 5 and 6. The relay KAP, which is energized at this time through its now closed contacts 4 and 5 and the normally-closed contacts 1 and 2 of the relay KD2, becomes deenergized upon the next time change when the relays KD1 and KD2 are energized in the manner previously explained. The contacts 24 and 25 (FIG. 1h) of the relay KAP open to interrupt one energizing circuit of the attendance mode relay KAM, but a second energizing circuit for this relay extends through its now closed contacts 7 and 8 the contacts 1 and 2 of the serializer cam-actuated contacts SS15. Upon deenergization of the relay KAP, its contacts 1 and 2 close to energize the relay KTS (and with it the relay KRR) through the now closed contacts 2 and 3 of the relay KAM so that one further time transmission takes place during which the relay KAM becomes deenergized by opening of the contacts 1 and 2 of the serializer cam-actuated contacts SS15. Contacts 29 and 30 (FIG. 1g) of the relay KAM now open to extinguish the attendance mode indicator lamp L3. The attendance mode of transmitter operation terminates after the serializer cam-actuated contacts SS10 energize the line conductor JLc to cause a length of transmission check to be made in the receiver, and thereafter the relay KRR is deenergized by interruption of its whole energizing circuit by the opening of the contacts 3 and 4 of the serializer cam-actuated contacts SS17 at 351° of the serializer cycle of operation.

When the attendance switch AT is manually set at its automatic attendance position, its now closed contacts 4 and 5 apply energization to normally-open contacts 1 and 2 of the time register hour cam-actuated contacts SRH14–SRH17 which are angularly fixedly adjustable on the hour shafts to be operated to closed contact position at any of four selectable hours of a twenty-four-hour day. These cam-actuated contacts are connected in series with individual ones of normally-open tenth-hour time shaft cam-actuated contacts SRT14–SRT17 which are likewise angularly fixedly adjustable on the tenths-hour shaft of the time register for operation to closed contact position at any of four selectable tenths hour. Now when one of the hour cam-actuated contacts SRH14–SRH17 and its associated tenths hour cam-actuated contacts SRT14–SRT17 are concurrently operated to closed contact position, the relay KAP is energized on the next time change when the delay relays KD1 and KD2 are energized in the manner previously explained. Energization of the relay KAP is continued, after deenergization of the relays KD1 and KD2, through the now closed contacts 4 and 5 of the relay KAP and the series-parallel connected and normally-closed contacts of the tenth hour and hour shaft cam-actuated contacts SRT10–SRT13 and SRH10–SRH13 of the time register until one of the hour cam-actuated contacts SRH10–SRH13 and a corresponding one of the tenths hour cam-actuated contacts SRT10–SRT13 concurrently move to open contact position. These hour and tenths-hour cam-actuated contacts are also adjustably fixedly positioned upon the hour and tenths-hour time shafts of the time register, and accordingly may be preset to positions terminating the automatic attendance mode of operation at any of four desired hour and tenth-hour times of the day. With the relay KAP energized as just described, the relays KTS, KRR, and KAM thereupon become energized in succession as previously described to effect a time transmission and to place the time transmitter and data transmission system in the automatic attendance mode of operation providing periodic time transmissions in the manner just above described. The attendance mode terminates upon alternate deenergization of the relays KAP and KAM under control of the automatic attendance time register cam-actuated contacts SRH10–SRH13 and SRT10–SRT13.

It was previously explained that upon completion of each data transmission to the receiver-recorder of the data transmission system the receiver-recorder automatically requests a time transmission from the time transmitter, records the resultant received time transmission, and counts the time and day digits as a portion of the data transmission in making a final length of message check indicative of a message received without error. However, the receiver-recorder of the data transmission system may merely be operated to receive each data transmission and check it for message length accuracy without requesting a time transmission. For this character of receiver-recorder operation, the time transmitter transmits to the receiver-recorder periodic time transmissions in the same manner as previously described for the operation of the system in the attendance mode but with the difference that these periodic time transmissions are made irrespective of whether the data transmission system operates to transmit data or operates in the attendance mode.

When the last-mentioned type of receiver-recorder operation is selected, the jumper connections between the terminals TA47 and TA49 (FIG. 1c) and between the terminals TA32 and TA33 are removed and a jumper connection is made between the terminals TA32 and TA49. These changed jumper connections maintain the line conductor JLY continuously energized from the receiver energized line conductor JLe, and the continuous energization of the line conductor JLY is now used by the receiver-recorder to accomplish its message length accuracy check following completion of each data transmission. Each time change now effects sequential energization of the relays KD1, KD2, KTS and KRR in the manner previously described to effect a time transmission, but the contacts 7 and 8 (FIG. 1c) of the relay KRR are now no longer energized to effect energization of the receiver-recorder attendance mode relay (KCM). However, energization of the relay KAP during an attendance mode of system operation effects the previously described energization of the attendance mode relay KAM, and contacts 27 and 28 of the latter now energize the line conductor JLa to energize the attendance mode relay (KCM) of the receiver-recorder. Further, the jumper connection between the terminal TA43 and TA45 (or that between the terminal TA41 and TA45) is removed and a jumper connection is made between the terminal TA45 and the terminal TA62 so that the relay KTS is energized at each time change. Lastly, the jumper connection between the terminals TA63 and TA65 (FIG. 1b) is removed so that the transaction code relay KTC is not energized at each time change but jumper connections are now completed between the terminal pairs TA53–TA73 (FIG. 1a), TA57–TA75 and TA69–TA77 so that a time transaction code 1–2–3–4–5 is transmitted at each time change. For this character of operation where time transmissions are effected at each time change, the line conductor JLV (extending through normally-closed contacts 4 and 5 of the relay KTS, normally-closed contacts 21 and 22 and relays KD2, and normally-closed contacts 1 and 2 of the relay KHLT) is deenergized at the outset of the time change when the "A" synchronous motor operates the contacts 1 and 2 of the cam-actuated contacts SCS1–A to the open circuit position (the relays KSD and KARC being deenergized at this time). This deenergization of the conductor JLV provides an interval within which any time transmission in progress may be completed before a time change takes place. As earlier explained, the line conductor JLV is reenergized just after the time change through the normally-closed contacts 21 and 22 of the relay KFD and the then closed contacts 13, 14 of the relay KARC when the time register main drive shaft cam-actuated contacts SRM12 close at 345° of the main shaft revolution. During a time register synchronization and correction operation hereinafter described, the "A" synchronous clock is halted with the contacts 1 and 2 of its cam-actuated contacts SCS1–A open and a "B" synchronous clock is operative to effect three time changes at each of which the "B" synchronous clock cam-actuated contacts SCS1–B and then closed contacts 5 and 6 of a motor prime relay KMP provide the deenergization of the JLV line conductor to accomplish the delay interval for the purpose last mentioned.

It is often desired that the time register of the central time transmitter be operated in synchronism with a master clock system used in a particular application to control a variety of remotely situated time devices such as wall clocks, time stamps, and the like. The master clock system includes a master clock which conventionally transmits hourly synchronizing signals so that a remote time device which is slow or fast can be synchronized with the master clock by correcting any deviations occurring within the hour. All master clock systems record time in hours and minutes and the exact time during each hour when the master clock synchronizing signals are transmitted, while usually varying from system to system, generally occurs at the start of some preselected minute of odd or even minute value other than the exact hour. The time register of the central time transmitter above described registers time to the nearest hundredth of an hour and thus must be synchronized at the start of a particular hundredth of the hour rather than at a minute.

Since hundredths of hours and minutes coincide every third minute ($3/100$ hour), a time corrective synchronizing clock (hereinafter called the "B" synchronizing clock to distinguish it from the "A" synchronizing clock which normally operates the time register between hourly synchronizing or corrective intervals) is provided in the time register to initiate time synchronization and any necessary time correction of the latter in dependance upon the preselected minute within the hour at which the master clock system synchronizing signal is transmitted. In particular, and as will be described more fully hereinafter, the "B" synchronizing clock of the time register begins a four-cycle period of operation upon transmission of the master clock synchronizing signal and includes a pair of contacts SCS3–B (FIG. 1e) which are closed at the beginning of the time synchronization and any necessary time correction of the time register. These contacts are angularly adjusted, and thereafter fixed, on the output shaft of the "B" synchronous clock to open a preselected interval after the master clock of the particular system transmits its synchronizing signal to initiate operation of the "B" synchronizing clock. Thus if the master clock transmits its hourly synchronizing signal at minute 3, 6, 9, 12, 15, 18, . . . 57, 60, the contacts SCS3–B will be angularly adjusted to open thirty-six seconds after initiation of operation of the "B" synchronizing clock. If on the other hand the master clock transmits its hourly synchronizing signal at minute 1, 4, 7, 10, 13, . . . 52, 55, 58, the contacts SCS3–B will be angularly adjusted to open twelve seconds after initiation of the operation of the "B" synchronizing clock. Or if the master clock transmits its hourly synchronizing signal at minute 2, 5, 8, 11, 14, 17, . . . 56, 59, the contacts SCS3–B will be angularly adjusted to open twenty-four seconds after initiation of the operation of the "B" master clock. For a setting of the contacts SCS3–B between 105° and 135°, the control exerted by the "A" synchronizing clock may conflict with the control exerted by the "B" synchronizing clock and in such event the conflict is resolved by completing a jumper connection between the terminals TB11 and TB45 (FIGS. 1e and 1f). In the following description of the time synchronization and time corrective operation of the time register, it is assumed by way of illustrative specific example that the master clock system transmits its synchronizing signal at the beginning of the fifty second minute after the hour and accordingly that the contacts SCS3–B of the "B" synchronizing clock are angularly adjusted to open twelve seconds after the fifty second minute and thereby initiate time register synchronization and any required time correction. Other time intervals mentioned in the following description are understood to be fully applicable irrespective of the angular setting of the contacts SCS3–B for the particular master clock system with which the time register may be used.

As will be described more fully hereinafter, the time register includes certain relay controls to detect when the tenths and hundredths of hours digit of the time register have reached a specific value which may conveniently be called the time synchronous value. If the time registered by the time register reaches this time synchronous value prior to a designated time in the hour as established by a correction potential pulse emanating from the master clock system, it is known that the time register is fast. If the time register has not reached the time synchronous value by this designated time in the hour, it is known that the time register is slow. Determination that the time register is fast, and its correction if slow, centers around operation of the "B" synchronous clock.

The operation of the "B" synchronous clock can be initiated only by the correction potential pulse of the master clock system, and each initiation of its operation halts operation of the "A" synchronizing clock at the end of an operating cycle of the latter. If the time register reaches the synchronous value and there has been no correction potential pulse from the master clock system, it is assumed that the latter is inoperative and advance of the time register continues without interruption under control of the "A" synchronous clock (any later received correction potential pulse from the master clock system then has no effect). Now when the time register is advanced to the succeeding hundredths hour, an alarm lamp is lighted and a warning buzzer sounds. Manual operation of a reset switch silences the buzzer and restores the master clock system control. The operator at this time also effects a manual correction of the time register setting with reasonable accuracy (not more than eighty-four seconds fast), and the next master clock correction potential pulse will reduce to a negligible amount any error in this manual setting of the time register.

Assume in this respect that the time register setting is fast by only a small amount, as can occur when it is set manually, and that it is to be advanced to the next hundredths hour after the time synchronous value. If a correction potential pulse has arrived from the master clock system, the alarm lamp will light but advance of the time register is delayed awaiting the appropriate time for its advance. If the time register reaches the time synchronizing value upon the second time advance of the "B" synchronizing clock, it is known that the time register is correct and it is advanced once more by the "B" synchronizing clock which in this case also initiates resumed operation of the "A" synchronizing clock and restores the control of the latter over the normal time advances of the time register (the "B" synchronizing clock continuing to operate to completion of its full cycle at which time it halts). If the time synchronizing value of the time register should not be reached by the latter upon the second advance effected by the "B" synchronizing clock, it is known that the time register is slow and accordingly it is then continuously advanced until it records the time synchronizing value. Thereafter the "B" synchronizing clock once more advances the time register and returns control of further time advances to the "A" synchronizing clock.

Normal time advances of the time clock are accomplished by energization of a time advance clutch magnet LTA (FIG. 1f) through an energizing circuit which includes the normally closed contacts 1 and 2 of the serializer cam-actuated contacts SS19 (closed when the serializer has completed its cycle of operation), normally closed contacts 1 and 2 of time register main drive-shaft cam-actuated contacts SRM–5 (used to deenergize the clutch magnet LTA from 15° to 250° of each time advance), normally closed contacts 1 and 2 of a relay KARC, normally closed contacts 1 and 2 of the time register tenths hour time shaft cam-actuated contacts SRT–7 (which open at 0.8 hour) or normally closed contacts 1 and 2 of the one-hundredths hour time shaft cam-actuated contacts SRC–12 (which open at 0.08 hour), normally closed contacts 2 and 3 of a time advance switch S2, normally closed contacts 23 and 24 of the relay KHLT, normally closed contacts 4 and 5 of the halt switch S1, normally closed contacts 1 and 2 of a motor prime relay KMP, and the normally open contacts 3 and 4 of the "A" synchronous clock operated contact set SCS2–A when these contacts close for three seconds once every thirty-six seconds. The "A" synchronous clock also operates a contact set SCS1–A having contacts 3 and 4 which close one second before closure of the contacts of the contact set SCS2–A and remain closed for thirteen seconds. The "A" synchronous clock is energized from a suitable alternating current source through contacts 1 and 2 (FIG. 1e) of the "A" synchronous clock contact set SCS2–A which are used to halt the "A" synchronous clock motor in a manner presently to be described but are normally rendered inactive by a shunt circuit which includes normally closed contacts 24 and 25 of a stop timer relay KST in series with the normally closed contacts 23 and 24 of a motor selector relay KMS or the normally closed contacts 27 and 28 of a motor prime relay KMP. Thus the "A" synchronous clock remains energized as long as the stop timer relay KST and both the motor selector relays KMS and the motor prime relay KMP remain deenergized.

The time clock is corrected, if such correction should be necessary, once each hour under control of a master clock 10 (FIG. 1f). The latter effects periodic energization (at the assumed fifth second minute after the hour) of a relay KRP which is included in a unit 11 hereinafter described more fully, and this relay upon each such energization closes its contacts to initiate a time register synchronization and corrective operation. In considering this hourly time register synchronization, it will be assumed by way of example that the time register is running slow. The contacts of the relay KRP upon closing energize a correction memory relay KCM through a circuit which includes the normally closed contacts 21 and 22 of an alarm relay KAL. The relay KCM then remains energized through its now closed contacts 5 and 6 and the contacts 3 and 4 of the "B" synchronous clock cam-actuated contact set SCS3–B which are closed when the "B" synchronous clock is halted as is presently the case for initiation of a time corrective operation.

The now closed contacts 7 and 8 of the relay KCM energize a second divider relay KSD through a circuit which includes the normally closed contacts 24, 25 of the motor prime relay KMP and a current limiting resistor R1. The relay KSD establishes a hold circuit through its now closed contacts 23 and 24. The now closed contacts 24 and 25 (FIG. 1h) of the relay KCM also energize a motor selector relay KMS through a circuit which includes the normally closed contact pairs 7, 8 and 21, 22 of the motor prime relay KMP and a resistor R2.

Energization of the motor selector relay KMS effects energization of the "B" synchronous clock through the now closed contacts 24 and 25 of the relay KMS and the normally closed contacts 21 and 22 of a stop timer relay KST which are connected in parallel with, and render ineffective at this time, normally closed contacts 1 and 2 of the "B" synchronous clock cam-actuated contact set SCS2–B. The contacts 3 and 4 of the "B" synchronous clock cam-actuated contact set SCS3–B open three seconds after energization of the "B" synchronous clock, and this would interrupt the hold circuit of the correction memory relay KCM except that this hold circuit may yet be maintained during this first cycle of the "B" synchronizing clock through the closed contacts 3 and 4 of the "A" synchronous clock cam-actuated contact set SCS1–A (which close just ahead of the time advance interval and remain closed for thirteen seconds) and a diode rectifier CR2 or by the subsequent closing of contacts 3 and 4 of the "B" synchronous motor cam-actuated contact set SCS1–B (which close twelve seconds after energization of the B synchronous clock and remain closed for thirteen seconds) and a diode rectifier CR1. Hence, the hold circuit of the correction memory relay KCM is not fully interrupted for twenty-five seconds after energization of the "B" synchronous clock. Subsequent to energization of the correction relay KCM and the motor selector relay KMS with resultant energization of the "B" synchronous clock as just described, there is a further time advance by energization of the time advance clutch magnet LTA upon closure of the contacts 3 and 4 of the "A" synchronous clock cam-actuated contact set SCS2–A.

When the hold energization circuit of the correction memory relay KCM becomes interrupted in the manner last explained, the relay KCM becomes deenergized to open its contacts 24 and 25 (FIG. 1h) and a motor prime relay KMP is now energized in series with the now energized motor selector relay KMS through the now closed contacts 9 and 10 of the latter. Prior to energization of the motor prime relay KMP, its normally closed contacts 27 and 28 shunted the contacts 1 and 2 of the "A" synchronous clock cam-actuated contact set SCS2–A to render the latter ineffective to control the "A" synchronous clock energization during the interval between time corrections. The "A" synchronous clock, upon energization of the motor prime relay KMP, is accordingly A.C. deenergized when the contacts 1 and 2 of the contact set SCS2–A open thirteen seconds after energization of the motor prime relay KMP and its rotation is quickly halted by energizing it with unidirectional current supplied through a rectifier CR7.

The next time the contacts 3 and 4 of the "B" synchronous clock cam-actuated contact set SCS2–B close following energization of the motor prime relay KMP as last described, there is a time advance by energization of the time advance clutch magnet LTA through the energizing circuit previously traced but which now includes the now closed contacts 2 and 3 of the relay KMP and the contacts 3 and 4 of the cam-actuated contact set SCS2–B.

A first divider relay KFD (FIG. 1e) is now energized through the normally closed contacts 21 and 22 of a relay KFP, the now closed contacts 7 and 8 of the relay KSD, a diode rectifier CR9, the normaly closed contacts 21 and 22 of the relay KCM and the normally open contacts 3 and 4 of the "B" synchronous clock-actuated contact set SCS1–B when the latter next close forty-eight seconds after energization of the "B" synchronous clock as previously described. The contacts 3 and 4 of the "B" synchronous clock-operated contact set SCS1–B close for thirteen seconds, and the contacts 3 and 4 of the "B" synchronous clock operated contact set SCS2–B close one second after the contacts of the contact set SCS1–B and for a three second interval. When the contacts 3 and 4 of the "B" synchronous clock-operated contact set SCS1–B open to remove positive energization from the first divider relay KFD, a first prime relay KFP is energized in series with the relay KFD through the now closed contacts 7 and 8 of the latter and the now closed contacts 27 and 28 of the relay KSD. Upon closure of the contacts 3 and 4 of the "B" synchronous clock-operated contact set SCS1–B twenty-three seconds after these contacts last opened, the relay KSD is deenergized by applying to the juncture of this relay and the resistor R1 a positive potential supplied through the now closed contacts 22 and 23 of the relay KFP, the now closed contacts 7 and 8 of the relay KSD, the diode rectifier CR9, the normally closed contacts 21 and 22 of the relay KCM and the now closed contacts 3 and 4 of the "B" synchronous clock-operated contact set SCS1–B. The contacts 27, 28 of the relay KSD open and would deenergize the relay KFD and one-half of the operating winding of the relay KFP except that it has heretofore been assumed that the time clock is running slow and, by reason of this, energization continues to be supplied to these relays through the now closed contacts 1 and 2 of the time register tenth hour shaft cam-actuated contacts SRT–9 (which open when the time clock advances to 0.8 hour) or the contacts 3 and 4 of the time register one-hundredth hour shaft cam-actuated contacts SCR–12 (which open when the clock has advanced to the 0.08 hour). Upon the next closure of the contacts 3 and 4 of the "B" synchronous clock-operated contact set SCS2–B, a further time clock advance is effected by energization of the time advance clutch magnet LTA through the now closed contacts 2 and 3 of the relay KMP.

Each time advance, including the one last mentioned, energizes a relay KARC (FIG. 1h) through the contacts 1 and 2 of the time register main drive shaft cam-actuated contact SRM8 which close at 15° and open at 195° of the main drive shaft rotation. A hold circuit for the relay KARC is established through the now closed contacts 9 and 10 of the latter, the normally closed contacts 23 and 24 of a halt relay KHLT, the normally closed contacts 4 and 5 of the halt switch S1, the now closed contacts 2 and 3 of the relay KMP, the now closed contacts 29 and 30 of the relay KARC, and the now closed contacts 3 and 4 of the "B" synchronous clock-operated contact set SCS1-B which remain closed for thirteen seconds to maintain the hold circuit of the relay KARC for this interval. It was previously assumed that the time register was running slow, and its setting is now automatically corrected by continuous energization of the time advance clutch magnet LTA. This energizing circuit extends through the normally closed contacts 1 and 2 of the serializer contact set SS19, the normally closed contacts 1 and 2 of the time register main drive shaft cam-actuated contacts SRM-5, the now closed contacts 5 and 6 of the relay KFD, the normally closed contacts 21 and 22 of the relay KSD, the now closed contacts 7 and 8 of the relay KARC, the now closed contacts 1 and 2 of the tenths hour time shaft cam-actuated contacts SRT-9 or the contacts 3 and 4 of the hundredths hour shaft cam-actuated contacts SRC-12, the diode rectifier CR6, and the now closed contacts 24 and 25 of the relay KFP. This continuing energization of the time advance clutch continuously advances the setting of the time register until the contacts 1 and 2 of the time register tenths hour time shaft cam-actuated contacts SRT-9 open at 0.8 hour and the contacts 3 and 4 of the hundredths hour time shaft cam-actuated contacts SRC-12 open at 0.08 hour which establishes a correct time register setting of 0.88 hour corresponding to the fifty-second minute and forty-eighth second after the hour. Contacts 1 and 2 of the tenths hour cam-actuated contacts SRT-9 and contacts 3 and 4 of the hundredths hour cam-actuated contact SRC-12 now open to deenergize the relay KFD and to deenergize one-half of the relay winding of the relay KFP, but the other half of the winding of the relay KFP now becomes energized through the now closed contacts 3 and 4 of the tenths hour time shaft cam-actuated contact SRT-9 and the contacts 7 and 8 of the hundredths hour time shaft cam-actuated contacts SRC-12 and the now closed contacts 24, 25 of the relay KFP. The deenergization of the relay KFD effects opening of its contacts 5 and 6 further to deenergize the continuous energization of the time advance clutch magnet LTA and thus complete the automatic time correction operation. During the period of this continuous time advance, the energized state of the relay KARC to close its contacts 33 and 34 (FIG. 1g), the energized state of the relay KFD to close its contacts 29 and 30, and the deenergized state of the relay KSD to close its contacts 1 and 2 signify that at time register correction has taken place and a time error lamp L4 is thereupon lighted.

On the third time advance effected by the closing of the contacts 3 and 4 of the "B" synchronous clock-operated contact set SCS1-B, the relay KCM is again energized through a circuit which includes a diode rectifier CR5, the contacts 3 and 4 of the time register main drive shaft cam-actuated contacts SRM-11, normally closed contacts 23 and 24 of the relay KARC, now closed contacts 4 and 5 of the relay KFP, normally closed contacts 1 and 2 of the relay KFD, now closed contacts 3 and 4 of the tenths hour shaft cam-actuated contacts SRT-7, now closed contacts 5 and 6 of the hundredths hour time shaft cam-actuated contacts SRC-12, normally closed contacts 2 and 3 of the advance switch S2, normally closed contacts 23, 24 of the relay KHLT, normally closed contacts 4 and 5 of the halt switch S1, now closed contacts 2 and 3 of the relay KMP, and the now closed contacts 3 and 4 of the "B" synchronous clock-operated contact set SCS2-B. This energizing circuit of the relay KCM is extended through a diode rectifier CR10, the now closed contacts 21 and 22 of the relay KMS, the normally closed contacts 1 and 2 of the relay KARC, the normally closed contacts 1 and 2 of the time register main drive shaft cam-actuated contacts SRM-5, and the normally closed contacts 1 and 2 of the serializer contact set SS19 to the time advance clutch magnet LTA to effect the third time advance. Upon this energization of the relay KCM, its contacts 24 and 25 close to deenergize the relay KMS by completing a shunt circuit around it including the contacts 9 and 10 of the relay KMS, the now closed contacts 22 and 23 of the relay KMP, and the contacts 8 and 9 of the relay KMP. The relay KCM is maintained energized for twelve seconds through its now closed contacts 5 and 6, the diode rectifier CR1, and the now closed contacts 3 and 4 of the "B" synchronous clock-operated contact set SCS1-B. When the relay KCM becomes deenergized at the end of this twelve second interval, its contacts 24, 25 open to interrupt the energizing circuit of the relay KMP which thereupon becomes deenergized. During the third time advanced just considered, the contacts 1 and 2 of the main drive shaft cam-actuated contacts SRM8 close to energize the relay KARC which then remains energized through its now closed contacts 9 and 10, the normally closed contacts 23, 24 of the relay KHLT, the normally closed contacts 4 and 5 of the halt switch S1, the now closed contacts 2 and 3 of the relay KMP, the now closed contacts 29, 30 of the relay KARC, and the now closed contacts 3 and 4 of the "B" synchronous clock-operated contact set SCS1-B which open at the end of a twelve second interval to deenergize the relay KARC. The "A" synchronous clock motor is once more energized through the normally closed contacts 23 and 24 of the relay KMS and the normally closed contacts 24 and 25 of the relay KST. The contacts 27 and 28 of the relay KARC now open to deenergize one energizing circuit of the relay KFP, and the third time advance last considered causes contacts 7 and 8 on the hundredth hour time shaft cam-actuated contacts SRC-12 to open so that there is no further energizing circuit for the relay KFP which thereupon becomes deenergized. The now open contacts 24 and 25 of the relay KMS cause the "B" synchronous clock to become A.C. deenergized when the contacts 1 and 2 of its clock-operated contact set SCS3-B next open twelve seconds after opening of the contacts 3 and 4 of the "B" synchronous clock-operated contact set SCS1-B, and rotation of the clock is quickly halted by energizing it with direct current supplied through the diode rectifier CR8. Thereafter, the "A" synchronous clock provides periodic advances of the time register until initiation of the next correction interval approximately one hour later.

The foregoing described operation is premised upon the assumption that the time register is slow at the outset of the time correction interval. Assume now that he time register is maintaining correct time at the outset of the time correction interval. The operation proceeds as above-described by initial energization of the relay KCM and energization of the "B" synchronous clock when the relay KCM energizes in turn the relays KMS and KMP and the relay KSD. The "A" synchronous clock remains energized after energization of the relay KMP and until the contacts 1 and 2 of the "A" synchronous clock-operated contact set SCS2-A open as previously described. Also as previously described, the contacts 3 and 4 of the "B" synchronous clock-operated contact set SCS2-B provide two successive time advances and the contacts 3 and 4 of the "B" synchronous clock-operated contact set SCS1-B energize the relays KFD and KFP followed by deenergization of the relay KSD upon the second time advance operation of the contact set SCS1-B. Since it is assumed that the time register is maintaining correct time, the two time advances have advanced the register from 0.86 hour to 0.88 hour thus to open the contacts 1 and 2 of the tenths hour time shaft cam-actuated contacts SRT-9 and the contacts 3 and 4 of the hundredths hour time shaft cam-actuated contacts SRC-12 thereby to effect deenergization of the relay KFD. The relay KFP remains energized through its now closed contacts 24 and 25 and the now closed contacts 3 and 4 of the tenths hour time shaft cam-actuated contacts SRT–9 and the contacts 7 and 8 of the hundredths hour time shaft cam-actuated contacts SRC–12.

The deenergization of the relay KFD as just described effects opening of its contacts 5 and 6 (FIG. 1f) to prevent the earlier described time-corrective continuous energization of the time advance clutch magnet LTA. When the contacts 3 and 4 of the "B" synchronous clock-operated contact set SCS2–B again close to effect a third time advance to 0.89 hour, the contacts 7 and 8 of the hundredths hour time shaft cam-actuated contacts SRC–12 open but the relay KFP continues to remain energized through its now closed contacts 24 and 25 and the now closed contacts 27 and 28 of the relay KARC until the latter again becomes deenergized upon opening of the contacts 3 and 4 of the "B" synchronous clock-operated contact set SCS1–B at the end of the time advance. Since the second time advance set the time register to 0.88 hour and thus effected opening of the contacts 1 and 2 and closing of the contacts 3 and 4 of the tenths hour time shaft cam-actuated contacts SRT–7 (FIG. 1f) and likewise effected opening of the contacts 1 and 2 and closure of the contacts 5 and 6 of the hundredths hour time shaft cam-actuated contacts SRC–12, the relay KCM is energized at the outset of the third time advance last mentioned and in the manner previously described. This energization of the relay KCM deenergizes the relays KMS and KMP to initiate termination of energization of the "B" synchronous clock, as earlier explained, and to effect energization of the "A" synchronous clock. Hence under the assumed condition that the time register is registering correct time at the outset of the time correction interval, the time register is advanced three times by the "B" synchronous clock but without any further time correction and thereafter the "A" synchronous clock effects periodic time advances of the time register until the outset of the next time correction interval.

Assume lastly that the time register for some reason is advanced to a time setting of 0.88 hour and there is a further time advance by the "A" synchronous clock prior to energization of the relay KCM at the outset of a time correction interval. In this instance, an alarm relay KAL (FIG. 1h) is energized through the normally closed contacts 1 and 2 of the relay KFP, the normally closed contacts 1 and 2 of the register main drive shaft cam-actuated contacts SRM11, a diode rectifier CR3, the normally closed contacts 21 and 22 of the relay KARC, the now closed contacts 3 and 4 of the tenths hour time shaft cam-actuated contacts SRT–7 (registering 0.8 hour), the now closed contacts 5 and 6 of the hundredths hour time shaft cam-actuated contacts SRC–12 (now registering 0.08 hour), the normally closed contacts 2 and 3 of the advance switch S2, the normally closed contacts 23 and 24 of the relay KHLT, the normally closed contacts 4 and 5 of the halt switch S1, the normally closed contacts 1 and 2 of the relay KMP, and the contacts 3 and 4 of the "A" synchronous clock-operated contact set SCS2–A when these contacts close to advance the time register from 0.88 hour to 0.89 hour. The relay KAL is maintained energized through the normally closed contacts 1 and 2 of the relay KFP and the now closed contacts 22 and 23 of the relay KAL. The now closed contacts 24 and 25 (FIG. 1g) of the relay KAL energize a warning buzzer B and a time error lamp L4 through the normally closed contacts 21 and 22 of an alarm relay KALM. The now open contacts 21 and 22 of the relay KAL will prevent energization of the relay KCM at the outset of the correction interval so that an automatic time-corrective setting of the time register may not be effected. However, the person in attendance is warned by the sounding of the buzzer B and the now illuminated error lamp L4 that the time register is fast so that he can manually correct the register setting and then operate a reset switch S3. The contacts 4 and 5 of the latter are thereupon closed and energize an alarm memory relay KALM through an energizing circuit which includes the normally closed contacts 1 and 2 of the relay KFP and the now closed contacts 22 and 23 of the relay KAL. The relay KALM is maintained energized through its now closed contacts 4 and 5 from the energizing circuit last traced. The normally closed contacts 21 and 22 (FIG. 1g) of the relay KALM open to interrupt the energizing circuit of the alarm buzzer B and the error lamp L4, and the contacts 24, 25 (FIG. 1f) of the relay KALM now close to permit time-corrective energization of the relay KCM upon the next closure of the relay KRP contacts in accomplishing an automatic check of the time register synchronization of the type above described. During the course of this synchronization check, which should find the time register setting now correct and thus no corrective action required, the alarm relay KAL and alarm memory relay KALM are deenergized when the relay KFD becomes deenergized to open its contacts 9 and 10 at a time when the relay KFP is yet energized and its contacts 1 and 2 are yet open.

The time register may be manually set to a desired time setting by manual actuation of the halt switch S1 to close its contacts 2 and 3 and thereby energize a relay KST. The contacts 5 and 6 of the halt switch S1 also close to energize the halt relay KHLT through the normally open contacts 3 and 4 of the "A" clock cam-actuated contacts SCS2–A when the latter close at the next time advance. The contacts 24 and 25 (FIG. 1e) of the relay KST open to deenergize the "A" clock as soon as the contacts 1 and 2 of the "A" clock cam-actuated contacts SCS2–A open at the time advance (if the "B" clock is operated at this time, the contacts 21 and 22 of the relay KST open to deenergize the "B" clock when the contacts 1 and 2 of the "B" clock cam-actuated contacts SCS3–B next open). The time register may now be advanced one-hundredth hour by each manual actuation of the advance switch S2 to close its contacts 1 and 2 and its contacts 4 and 5 whereby the energization supplied to energize the relay KHLT is supplied through the last-mentioned contacts of the switch S2, the normally closed contacts 1 and 2 of the relay KARC, the normally closed contacts 1 and 2 of the cam-actuated contacts SRM–5 and the normally closed contacts 1 and 2 of the serializer cam-actuated contacts SS19 to the time register advance clutch magnet LTA. In this operation, each such time advance energizes the relay KARC when the main clock shaft contacts SRM–8 close at 15° of the main clock shaft cycle and the contacts 1 and 2 of the relay KARC open to interrupt the advance clutch energizing circuit last traced and which includes the now closed contacts 4 and 5 of the advance switch S2. The relay KARC thereafter remains energized through its now closed contacts 9 and 10 so long as the advance switch S2 remains manually depressed to close its contacts 4 and 5 so that the time register is advanced only one hundredth hour for each manual operation of the advance switch S2. The relay KHLT upon becoming energized establishes a hold energizing circuit through its now closed contacts 9 and 10, the normally closed contacts 1 and 2 of the relay KMP, and the now closed contacts 3 and 4 of the "A" clock cam-actuated contacts SCS2–A which remain closed since this clock is halted. While the relay KHLT remains energized, its contacts 21 and 22 (FIG. 1c) open to prevent a time transmission which might otherwise be effected by energization of the relay KTS, its contacts 1 and 2 (FIG. 1c) open to prevent energization of the receiver relay KRO, and its contacts 28 and 29 (FIG. 1g) open to extinguish the "clock-on" indicator lamp L2. When the halt switch S1 is released, the relay KST is deenergized to close its contacts 24 and 25 and reenergizes the "A" synchronous clock (or its contacts 21 and 22 close to reenergize the "B" synchronous clock). The relay KHLT continues to remain energized through its hold circuit above described until the "A" clock cam-actuated contact SCS2–A contacts 3 and 4 open, and while this is occurring the now open contacts 23 and 24 of the relay KHLT prevent the energization supplied to the energizing circuit of the relay KHLT from being applied through the now closed contacts 4 and 5 of the halt switch S1 and the normally closed contacts 2 and 3 of the advance switch S2 (if manually released) or the now closed contacts 4 and 5 of the advance switch S2 (if yet manually actuated) to the tenths hour and hundredths hour cam-actuated contacts shown in FIG. 1*f*).

In the operation last described, it was assumed that the time register had advanced to 0.88 hour and that the "A" synchronous clock provided a further time advance prior to energization of the relay KCM at the outset of a time correction interval. The relay KCM can be energized by closure of the contacts 3 and 4 of the time correction interval relay KRP, even momentarily before the "A" synchronous clock time advance. When this occurs, the alarm relay KAL is energized as just described but energization of the relay KCM initiates a time-corrective interval operation by immediate energization of the relays KSD and KMS. This ensures operation of the "B" synchronous clock, and the alarm relay KAL is now deenergized when the relay KCM is shortly thereafter deenergized to energize the relay KMP and the next three "B" synchronous KFD and KFP and thus interrupt the hold energizing circuit (contacts 9 and 10 of the relay KFD or contacts 2 and 3 of the relay KFP) of the alarm relay KAL.

FIG. 2 shows the electrical circuit arrangement of the unit 11 for use with a master clock 10 of the type marketed by the Simplex Time Recorder Company of Gardner, Massachusetts. This master clock supplies periodic output potential pulses, represented by curve A which render an output circuit conductor 15 positive with respect to an output circuit conductor 16; it also supplies output potential pulses, represented by curve B, which render an output circuit conductor 17 also positive with respect to the output circuit conductor 16. The output potential pulses of the output circuit conductors 15 and 17 have equal amplitudes and occur in time coincidence at minute intervals to the fifty-second minute after the hour, but between the fifty-second minute and the fifty-ninth minute of the hour no potential pulses appear in the output circuit 17.

A relay KL may be connected through the contacts 1 and 2 of a relay KLR between the circuit conductors 16 and 17, and the relay KLR may be connected through the contacts 1 and 2 of the relay KRP between the circuit conductors 15 and 16. The relay KRP is connected through a diode rectifier CR40 between the circuit conductors 15 and 17, and the junction of the latter rectifier and the winding of the relay KRP is connected through a resistor R40 and a diode rectifier CR41 to the contact 2 of the relay KRP. The contacts 1 and 2 of the relay KL shunt the diode rectifier CR41 and the contacts 1 and 2 of the relay KRP as shown. Whenever the relay KL is energized, it closes its contacts 1 and 2 and latches them in closed position and at the same time unlatches the contacts 1 and 2 of the relay KLR to open-circuit position. Conversely, when the relay KLR is energized, it closes its contacts 1 and 2 and latches them in closed position and at the same time unlatches the contacts 1 and 2 of the relay KL to open-circuit position.

In considering the operation of this arrangement, assume that the contacts 1 and 2 of the relay KLR are latched in closed contact position at a time when positive polarity potential pulses are concurrently supplied to the output circuit conductors 15 and 17. These potential pulses do not energize the relay KRP since the latter has equal amplitude potentials of the same polarity applied to its relay winding, but the positive potential pulse supplied to the output circuit conductor 17 energizes the relay KL under the assumed condition that the contacts 1 and 2 of the relay KLR are closed. The relay KL thereupon closes and latches its contacts 1 and 2 and unlatches the contacts 1 and 2 of the relay KLR to open-circuit position. Subsequent positive polarity pulses concurrently supplied to the output circuit conductors 15 and 17 have no further effect, but at the fifty-second minute after the hour a positive polarity pulse is supplied to the output circuit conductor 15 but no positive polarity pulse is concurrently supplied to the output circuit conductor 17. The positive polarity pulse of the conductor 15 thereupon energizes the relay KRP to close its contacts 1 and 2 and its contacts 3 and 4, and the latter energize the relay KCM earlier described in connection with FIG. 1*f* of the synchronizing system. The energizing circuit for the relay KRP extends from the conductor 15 through the winding of the relay KRP, the resistor R40, and the now closed contacts 1 and 2 of the relay KL to the output circuit conductor 16. The contacts 1 and 2 of the relay KRP energize the relay KLR to close and latch its contacts 1 and 2 and concurrently to unlatch the contacts 1 and 2 of the relay KL to open-circuit position. Upon opening of the contacts 1 and 2 of the relay KL, the relay KRP continues to remain energized for the duration of the positive polarity pulse through a diode rectifier CR41 and the now closed contacts 1 and 2 of the relay KRP. At the end of the positive polarity pulse which energized the relay KRP, its contacts 1 and 2 open to deenergize the relay KLR and the now open contacts 1 and 2 of the relay KL prevent subsequent energization of the relay KRP by positive polarity supplied to the output circuit conductor 15 in the absence of positive polarity pulses supplied to the output circuit conductor 17. Upon the next concurrent supply of positive polarity pulses to both of the conductors 15 and 17, the relay KL is again energized to repeat the operation just described. Thus the relay KRP is energized to close its contacts 3 and 4, extending to FIG. 1*f* of the synchronizing system, only on the fifty-second minute of each hour.

FIG. 3 is an electrical circuit diagram showing a modified form of the unit 11 suitable for use with a master clock 10 of the type marketed by the Stromberg Division, General Time Corporation, of Thomaston, Conn. This form of master clock 10 supplies to its output circuit conductors 20 and 21 potential pulses which are repetitive at minute intervals and have positive polarity from the beginning of the hour to the fifty-second minute after the hour at which time one or more negative polarity pulses are supplied to the output circuit conductors 20 and 21. In considering the FIG. 3 arrangement, assume that the first negative pulse supplied to the output circuit conductors 20 and 21 finds the contacts 2 and 3 of a relay KNM closed and the contacts 21 and 22 of the relay KN also closed. This first negative pulse energizes a relay KR through a diode rectifier CR45, and the contacts 2 and 3 of the relay KR thereupon close to energize the relay KRP through the now closed contacts 2 and 3 of the relay KNM. A diode rectifier CR46 is connected in shunt to the winding of the relay KR with the polarity shown to cause the latter to retain its contacts 2 and 3 closed for approximately fifteen milliseconds after the termination of the negative energization pulse. The relay KRP, upon becoming energized, closes its contacts 7 and 8 to energize a relay KRM during the applied negative pulse. The relay KRM closes its contacts 22 and 23 and latches them in closed-contact position while at the same time unlatching the contacts 2 and 3 of the relay KNM to open-contact position so that the relay KRP must now remain energized during the period of the negative pulse through a diode rectifier CR47 and the now closed contacts 7 and 8 of the relay KRP. The contacts 3 and 4 of the relay KRP are closed at this time to energize the relay KCM as heretofore described in connection with FIG. 1*f* of the time synchronizing system. If the timing potential pulses of the master clock 10 are supplied through a circuit of significant inductance, this first negative timing pulse may be terminated by an inductive surge potential of positive polarity. The latter is isolated from the relays KR and KRP, however, by the respective diode rectifiers CR45 and CR47. Subsequent negative polarity pulses effect energization of the relay KR through the diode rectifier CR45, but the relay KRP is not again energized since the contacts 2 and 3 of the relay KNM are now open and the contacts 7 and 8 of the relay KRP open at the termination of the first negative pulse. The next positive polarity pulse applied to the output circuit conductors 20 and 21 effect energization of the relay KN through the normally closed contacts 1 and 2 of the relay KR and a diode rectifier CR48, a diode rectifier CR50 being connected across the winding of the relay KN with the polarity shown to provide continued closure of its contacts 22 and 23 for approximately fifteen milliseconds after the termination of the positive polarity pulse. The relay KN upon closing its contacts 22 and 23 energizes a relay KNM through the now closed and latched contacts 22 and 23 of the relay KRM. The relay KNM upon becoming energized closes its contacts 2 and 3 and latches them in closed position and at the same time unlatches the contacts 22 and 23 of the relay KRM to open-circuit position. The relay KRP is not energized at this time, however, since the contacts 2 and 3 of the relay KR are open. A negative polarity inductive surge potential at the end of this positive polarity timing pulse is isolated from the relay KN by the diode rectifier CR48. Subsequent positive polarity pulses applied to the output circuit conductors 20 and 21 effect subsequent energizations of the relay KN, but the relay KNM is not again energized by these pulses since the contacts 22 and 23 of the relay KRM are open. The first negative polarity pulse applied to the output circuit conductors 20 and 21 at the fifty-second minute after the hour once more energizes the relay KR to repeat the sequence of operations just described and once more to effect closure of the contacts 3 and 4 of the relay KRP for the duration of this negative polarity pulse.

In the foregoing description of the FIG. 3 arrangement, it was noted that the diode rectifiers CR46 and CR50 maintain the respective relays KR and KN energized for approximately fifteen milliseconds following termination of the respective negative polarity and positive polarity timing potential pulses which energize these relays. This has the importance that the open contacts 1 and 2 of the relay KR when energized prevent a positive polarity inductive surge potential terminating a negative timing pulse, from energizing the relay KN and the open contacts 21 and 22 of the relay KN prevent a negative polarity inductive surge potential (terminating a positive timing pulse) from energizing the relay KR so that false operation of the relays KR and KN by such inductive surge potentials is accordingly avoided.

FIG. 4 shows the electrical circuit arrangement of a simplified form of master clock suitable for use with the FIG. 3 arrangement just described. This master clock includes a toggle switch S10 which may be manually actuated to close its contacts 1 and 2 and thereby energize, from a suitable alternating current source, a conventional fullwave rectifier system 30 to provide a source of unidirectional potential for operation of the clock. Manual operation of the switch S10 also effects closure of its contacts 3 and 4 to energize a synchronous motor 31 from an alternating current source of a highly stable and precise primary-time-standard frequency. The motor 31 is provided with cam-actuated contacts 32 and 33 which are operated to closed-contact position one each minute and for approximately 1.5 seconds to energize the operating winding MU of a conventional ten-position minutes stepping switch. The movable contact 34 of a first contact deck of the stepping switch accordingly is stepped at one minute intervals, and upon reaching the ninth step energizes the stepping winding MT of a conventional six-step tens-of-minutes stepping switch. The minutes stepping switch includes a second deck of stepping contacts having contact positions 1–9 electrically connected to the positive terminal of the power supply 30 and having the movable contact 35 of this deck electrically connected to the fifth step contact of the tens stepping switch. The movable contact 36 of the tens stepping switch is connected through motor-driven cam-actuated contacts 37 and 38, operated to closed-contact position once each minute and in alternating relation to closure of the cam-actuated contacts 32 and 33, to energize a polarity reversing relay KR. The latter thereafter remains energized through its contacts 1 and 2 while the tens stepping switch movable contact 36 engages the fifth step contact and the movable contact 35 of the minute stepping switch engages any of the first through the ninth stepping contacts of this stepping switch. The operating winding MU of the tens stepping switch includes contacts 1 and 2 which are closed by energization of the operating winding and thus effect supply of positive polarity potential pulses to the output circuit conductors 20 and 21 through the normally closed contacts 3 and 4 and normally closed contacts 5 and 6 of the reversing relay KR. These output potential pulses occur at one minute intervals and have a duration of approximately 1½ seconds by reason of the earlier described energization of the minute stepping switch operating winding MU. When the tens stepping switch has stepped to its fifth step to engage its movable contact 36 with the fifth step contact and while the minutes stepping switch contact 35 engages any of its step 1–9 contacts, corresponding to minutes 51–59 of the hour, the reverse relay KR is energized to transfer its contacts 3–10 and supply upon each energization of the stepping switch operating winding MU negative polarity potential pulses from the power supply 30 to the output circuit conductors 20 and 21 through the now closed contacts 7 and 8 and the now closed contacts 9 and 10 of the relay KR. These negative polarity potential pulses also occur at one minute intervals and each has a duration of approximately 1½ seconds. During the interval of these negative polarity pulses, contacts 11 and 12 of the reverse relay KR close to energize an indicator lamp 40 from the power supply 30.

It will be apparent from the foregoing description of the invention that a time synchronizing system embodying the invention is one suitable for synchronizing a self-operational time clock or register from any of numerous forms of available master time clocks including automatic periodic correction of the time recorded by the time register as required to maintain it in agreement with that of the master clock. The time synchronizing system of the present invention has the important advantage that it enables synchronization and correction of a time clock or register which records time in decimal notation in tenths or hundredths of an hour from a master clock which records time in hours and minutes. A time synchronizing system embodying the invention has the further advantage that it enables, by means of one simple and readily effected setting of a timing component, synchronization and correction of a time clock or register of the hundredths hour type by use of a synchronizing signal transmitted by a master clock at the beginning of any given minute within the hour, and thus enables synchronization of the time clock or register by use of any and all of the various synchronizing signals supplied by numerous of the available master clock systems currently in widespread usage.

While a specific form of the invention has been described for purposes of illustration, it is contemplated that numerous changes may be made without departing from the spirit of the invention.

What is claimed is:

1. A time synchronizing system comprising a time register and operational time reference means therein for controlling the register operations to register prevailing values of time, said register including indicating means for providing periodic indications of a preselected value of prevailing time registered by said register, a secondary time reference means, means including an input circuit adapted to receive at the period of said indications primary-time-indicative electrical synchronizing signals provided by a primary time reference means and responsive to each said signal for initiating operation of said secondary time reference means to transfer a primary time reference thereto and for transferring control over the operations of said time register from said operational time reference means to said secondary time reference means, means controlled by said secondary time reference means for utilizing the indications of said indicating means to compare the prevailing value of time registered by said register with the primary time reference transferred to said secondary time reference means and to provide corrective change of register time setting to eliminate time deviations found by said comparison to prevail, and means controlled by said secondary time reference means for transferring control over the operations of said time register from said secondary time reference means to said operational time reference means at the end of a preselected interval following said time indication comparison.

2. A time synchronizing system comprising a time register and an operational time reference clock therein for controlling the register operations to register prevailing values of time, said register including indicating means for providing periodic indications of a preselected value of prevailing time registered by said register, a secondary time reference clock, means including an input circuit adapted to receive at the period of said indications primary-time-indicative electrical synchronizing signals provided by a primary time reference source and responsive to each said signal for initiating operation of said secondary time reference clock to transfer a primary time reference thereto and for transferring control over the operations of said time register from said operational time reference clock to said secondary time reference clock, means controlled by said secondary time reference clock for utilizing the indications of said indicating means to compare the prevailing value of time registered by said register with the primary time reference transferred to said secondary time reference clock and to provide corrective change of register time setting to eliminate time deviations found by said comparison to prevail, and means controlled by said secondary time reference clock for transferring control over the operations of said time register from said secondary time reference clock to said operational time reference clock at the end of a preselected interval following said time indication comparison.

3. A time synchronizing system comprising a time register and operational time reference means therein for periodically controlling the register operations to register prevailing values of time, said register including indicating means for providing periodic indications of a preselected value of prevailing time registered by said register, a secondary time reference means, means including an input circuit adapted to receive at the period of said indications primary-time-indicative electrical synchronizing signals provided by a primary time reference means and responsive to each said signal for initiating operation of said secondary time reference means to transfer a primary time reference thereto and for transferring periodic control over the operations of said time register from said operational time reference means to said secondary time reference means, means controlled by said secondary time reference means for utilizing the indications of said indicating means to compare the prevailing value of time registered by said register with the primary time reference transferred to said secondary time reference means and to provide accelerated corrective change of register time setting to eliminate time deviations found by said comparison to prevail, and means controlled by said secondary time reference means for transferring periodic control over the operations of said time register from said secondary time reference means to said operational time reference means at the end of a preselected interval following said time indication comparison.

4. A time synchronizing system comprising a time register and operational time reference means therein for controlling the register operations to register prevailing values of time, said register including indicating means for providing periodic indications of a preselected value of prevailing time registered by said register, a secondary time reference means, means including an input circuit adapted to receive at the period of said indications primary-time-indicative electrical synchronizing signals provided by a primary time reference means and responsive to each said signal for initiating operation of said secondary time reference means to transfer a primary time reference thereto and for transferring control over the operations of said time register from said operational time reference means to said secondary time reference means, means controlled by said secondary time reference means for utilizing the indications of said indicating means to compare the prevailing value of time registered by said register with the primary time reference transferred to said secondary time reference means and to provide corrective change of register time setting to bring the indications of said indicating means into conformity with the time of said secondary time reference means and thereby eliminate time deviations found by said comparison to prevail, and means controlled by said secondary time reference means for transferring control over the operations of said time register from said secondary time reference means to said operational time reference means at the end of a preselected interval following said time indication comparison.

5. A time synchronizing system comprising a time register and operational time reference means therein for periodically advancing the register setting to register prevailing values of time, said register including indicating means for providing periodic indications of a preselected value of prevailing time registered by said register, a secondary time reference means, means including an input circuit adapted to receive at the period of said indications primary-time-indicative electrical synchronizing signals provided by a primary time reference means and responsive to each said signal for initiating operation of said secondary time reference means to transfer a primary time reference thereto and for transferring periodic advance control over the operations of said time register from said operational time reference means to said secondary time reference means, means controlled by said secondary time reference means upon a preselected advance of said register effected thereby for utilizing the indications of said indicating means to compare the prevailing value of time registered by said register with the primary time reference transferred to said secondary time reference means, means for periodically advancing at an accelerated rate the register time setting to eliminate any slow time deviations found by said comparison to prevail, and means controlled by said secondary time reference means upon a further advance of said register thereby subsequent to said preselected advance for transferring control over the periodic advance operations of said time register from said secondary time reference means to said operational time reference means.

6. A time synchronizing system comprising a time register and an operational time reference clock therein for periodically advancing the register setting to register prevailing values of time, said register including indicating means for providing periodic hourly indications of a preselected value of prevailing time registered by said register, a secondary time reference clock, means including an input circuit adapted to receive at the hourly period of said indications primary-time-indicative electrical synchronizing signals provided by a primary time reference means and responsive to each said signal for initiating operation of said secondary time reference clock to transfer a primary hourly time reference thereto and for transferring periodic advance control over the operations of said time register from said operational time reference clock to said secondary time reference clock, means controlled by said secondary time reference clock upon a preselected register advance effected thereby for utilizing the indications of said indicating means to compare the prevailing value of time registered by said register with the primary time reference transferred to said secondary time reference clock and to provide corrective change of register time setting at an accelerated rate to be completed within an advance period and thereby eliminate time deviations found by said comparison to prevail, and means controlled by said secondary time reference clock for transferring periodic advance control over the operations of said time register from said secondary time reference clock to said operational time reference clock at the end of a preselected advance interval following said time indication comparison.

7. A time synchronizing system comprising a time register and an operational time reference clock therein for controlling the register operations to register prevailing values of time; said register including indicating means for providing periodic indications of a preselected value of prevailing time registered by said register; a secondary time reference clock, control transfer means including an input circuit adapted to receive at the period of said indications primary-time-indicative electrical synchronizing pulse signals provided by a primary time reference source and responsive to each pulse of said signal for initiating operation of said secondary time reference clock to transfer a primary time reference thereto and for initiating halt of said operational time reference clock at a preselected setting thereof, means responsive to initiation of operation of said secondary time reference clock by said control transfer means for transferring control over the operations of said time register from said operational time reference clock to said secondary time reference clock; means controlled by said secondary time reference clock for utilizing the indications of said indicating means to compare the prevailing value of time registered by said register with the primary time reference transferred to said secondary time reference clock and to provide corrective change of register time setting to eliminate time deviations found by said comparison to prevail; and means controlled by said secondary time reference clock at the end of a preselected interval following said time indication comparison for initiating resumed operation of said operational time reference clock, for initiating halt of said secondary time reference clock at a preselected setting thereof, and for transferring control over the operations of said time register from said secondary time reference clock to said operational time reference clock.

8. A time synchronizing system comprising a time register and an operational time reference clock therein for controlling the register operations to register prevailing values of time; said register including indicating means for providing periodic indications of a preselected value of prevailing time registered by said register; a secondary time reference clock; means including an input circuit adapted to receive at the period of said indications primary-time-indicative electrical synchronizing signals provided by a primary time reference source and responsive to each said signal for initiating operation of said secondary time reference clock to transfer a primary time reference thereto, for initiating halt of said operational time reference clock at a preselected setting thereof and for transferring control over the operations of said time register from said operational time reference clock to said secondary time reference clock; means controlled by said secondary time reference clock at a preselected time register advance effected thereby and responsive to a time register setting error indication provided by said indicating means for providing corrective change of time register setting to a preselected value thereof; and means responsive to a further time advance of said time register by said secondary time reference clock for initiating resumed operation of said operational time reference clock and for transferring control over the operations of said time register from said secondary time reference clock to said operational time reference clock.

9. A time synchronizing system comprising a time register including advance means electrically energizable to effect each advance of the register, an operational time reference clock having electrical contacts periodically operable to energize said advance means and advance said register to record prevailing values of time, said register including indicating means for providing periodic indications of a preselected value of prevailing time registered by said register, a secondary time reference clock having periodically operable electrical contacts, means including an input circuit adapted to receive at the period of said indications primary-time-indicative electrical synchronizing signals provided by a primary time reference source and responsive to each said signal for initiating operation of said secondary time reference clock to transfer a primary time reference thereto and for transferring control over the energization of said advance means from the electrical contacts of said operational time reference clock to the electrical contacts of said secondary time reference clock, means controlled by the electrical contacts of said secondary time reference clock for utilizing the indications of said indicating means to compare the prevailing value of time registered by said register with the primary time reference transferred to said secondary time reference clock and including means responsive to any comparative time lag of said indicating means for providing continuing uninterrupted energization of said advance means during such interval as required to effect corrective change of register time setting to eliminate time deviations found by said comparison to prevail, and means controlled by said secondary time reference clock at the end of a preselected interval following said time indication comparison for transferring control over the energization of said advance means from the electrical contacts of said secondary time reference clock to the electrical contacts of said operational time reference clock.

10. A time synchronizing system comprising a time register including advance means electrically energizable to effect each advance of the register, an operational time reference clock having electrical contacts periodically operable to energize said advance means and advance said register to record prevailing values of time, said register including indicating electrical contacts operably providing periodic indications of a preselected value of prevailing time registered by said register, a secondary time reference clock having periodically operable electrical contacts, means including an input circuit adapted to receive at the period of said indications a primary-time-indicative electrical synchronizing pulse signal provided by a primary time reference source and responsive to each said pulse signal for initiating operation of said secondary time reference clock to transfer a primary time reference thereto and for transferring control over the energization of said advance means from the electrical contacts of said operational time reference clock to the electrical contacts of said secondary time reference clock, means controlled by the electrical contacts of said secondary time reference clock and by said indicating electrical contacts for comparing the prevailing value of time registered by said register with the primary time reference transferred to said secondary time reference clock and for providing by continuing uninterrupted energization of said advance means such corrective change of register time setting as to eliminate any lag of register indicated time found by said comparison to prevail, and means controlled by said secondary time reference clock at the end of a preselected interval following said time indication comparison for transferring control over the energization of said advance means from the electrical contacts of said secondary time reference clock to the electrical contacts of said operational time reference clock.

11. A time synchronizing system comprising a time register including advance means electrically energizable to effect each advance of the register; an operational time reference clock having electrical contacts periodically operable to energize said advance means and advance said register to record prevailing values of time; said register including indicating electrical contacts operably providing periodic indications of a preselected value of prevailing time registered by said register; a secondary time reference clock having periodically operable electrical contacts; means including an input circuit adapted to receive at the period of said indications a primary-time-indicative electrical synchronizing pulse signal provided by a primary time reference source and responsive to each said pulse signal for initiating operation of said secondary time reference clock to transfer a primary time reference thereto, for initiating halt of said operational time reference clock at a preselected setting thereof, and for transferring control over the energization of said advance means from the electrical contacts of said operational time reference clock to the electrical contacts of said secondary time reference clock; means controlled by the electrical contacts of said secondary time reference clock and by said indicating electrical contacts at a preselected time register advance effected by said secondary time reference clock for comparing the prevailing value of time registered by said register with the primary time reference transferred to said secondary time reference clock and for providing by continuing uninterrupted energization of said advance means such corrective change of register time setting as to eliminate any lag of register indicated time found by said comparison to prevail; and means responsive to a further time advance of said time register by said secondary time reference clock for initiating resumed operation of said operational time reference clock, for initiating halt of said secondary time reference clock at a preselected setting thereof, and for transferring control over the energization of said advance means from the electrical contacts of said secondary time reference clock to the electrical contacts of said operational time reference clock.

12. A time synchronizing system comprising a time register having a time-advance drive source adapted to advance the setting of said register at an accelerated time rate and including time-advance control means for coupling said source to said register to effect each of periodic time advances thereof, operational time reference means for periodically controlling said control means to effect individual periodic register advances according to preselected values of elapsed time units, said register including indicating means for providing periodic indications of a preselected value of prevailing time registered by said register, a secondary time reference means, means including an input circuit adapted to receive at the period of said indications primary-time-indicative electrical synchronizing signals provided by a primary time reference means and responsive to each said signal for initiating operation of said secondary time reference means to transfer a primary time reference thereto and for transferring from said operational time reference means to said secondary time reference means periodic control over said control means, means controlled by said secondary time reference means for utilizing the indications of said indicating means to compare the prevailing value of time registered by said register with the primary time reference transferred to said secondary time reference means and upon time deviations found by said comparison to prevail to provide corrective control over said control means independently of said secondary time reference means and effect advance of said register setting at an accelerated time rate to a preselected setting thereof, and means controlled by said secondary time reference means at the end of a preselected interval following said time indication comparison for transferring periodic control over said control means from said secondary time reference means to said operational time reference means.

13. A time synchronizing system comprising a time register having a time-advance drive source adapted to advance the setting of said register at an accelerated time rate and including time-advance control means for coupling said source to said register to effect each of periodic time advances thereof, operational time reference means for periodically controlling said control means to effect individual periodic register advances according to preselected values of elapsed time units, said register including indicating electrical contacts operably providing periodic indications of a preselected value of prevailing time registered by said register, a secondary time reference means, means including an input circuit adapted to receive at the period of said indications primary-time-indicative electrical synchronizing signals provided by a primary time reference means and responsive to each said signal for initiating operation of said secondary time reference means to transfer a primary time reference thereto and for transferring from said operational time reference means to said secondary time reference means periodic control over said control means, means controlled by said secondary time reference means and by said indicating electrical contacts for comparing the prevailing value of time registered by said register with the primary time reference transferred to said secondary time reference means and upon time deviations found by said comparison to prevail to provide corrective control over said control means and effect advance of said register setting at an accelerated time rate to a preselected setting thereof, and means controlled by said secondary time reference means at the end of a preselected interval following said time indication comparison for transferring periodic control over said control means from said secondary time reference means to said operational time reference means.

14. A time synchronizing system comprising a time register having a time-advance drive source adapted to advance the setting of said register at an accelerated time rate and including time-advance control means electrically energizable to couple said source to said register to effect each of periodic time advances thereof; operational time reference means having electrical contacts periodically operable to energize said control means and effect individual periodic register advances according to preselected values of elapsed time units; said register including indicating electrical contacts operably providing periodic indications of a preselected value of prevailing time registered by said register; a secondary time reference means having periodically operable electrical contacts; means including an input circuit adapted to receive at the period of said indications primary-time-indicative electrical synchronizing signals provided by a primary time reference means and responsive to each said signal for initiating operation of said secondary time reference means to transfer a primary time reference thereto, for initiating halt of said operational time reference means at a preselected setting thereof, and for transferring energization control over the energization of said advance means from the electrical contacts of said operational time reference means to the electrical contacts of said secondary time reference means; means controlled by the electrical contacts of said secondary time reference means and by said indicating electrical contacts at a preselected time register advance effected by said secondary time reference means for comparing the prevailing value of time registered by said register with the primary time reference transferred to said secondary time reference means and upon time deviations found by said comparison to prevail to provide by energization of said advance means corrective advance of said register setting at an accelerated time rate to a preselected setting thereof established by said indicating electrical contacts; and means responsive to a further time advance of said time register effected by said secondary time reference means for initiating resumed operation of said operational time reference means, for initiating halt of said secondary time reference means at a preselected setting thereof, and for transferring energization control over said advance means from the electrical contacts of said secondary time reference means to the electrical contacts of said operational time reference means.

15. A time synchronizing system comprising a time register and operational time reference means therein for controlling the register operations to register prevailing values of time, said register including indicating means for providing periodic indications of a preselected value of prevailing time registered by said register, a secondary time reference means, means including an input circuit adapted to receive at the period of said indications primary-time-indicative electrical synchronizing signals provided by a primary time reference means and responsive to each said signal for initiating operation of said secondary time reference means to transfer a primary time reference thereto and for transferring control over the operations of said time register from said operational time reference means to said secondary time reference means, means controlled by said secondary time reference means for utilizing the indications of said indicating means to compare the prevailing value of time registered by said register with the primary time reference transferred to said secondary time reference means and to provide a delay-type of corrective change of register time setting to eliminate fast-time deviations found by said comparison to prevail, and means controlled by said secondary time reference means for transferring control over the operations of said time register from said secondary time reference means to said operational time reference means at the end of a preselected interval following said time indication comparison.

16. A time synchronizing system comprising a time register and operational time reference means therein for controlling the register operations to register prevailing values of time, said register including indicating means for providing periodic indications of a preselected value of prevailing time registered by said register, a secondary time reference means, control means including an input circuit adapted to receive at the period of said indications primary-time-indicative electrical synchronizing signals provided by a primary time reference means and responsive to each said signal for initiating operation of said secondary time reference means to transfer a primary time reference thereto and for transferring control over the operations of said time register from said operational time reference means to said secondary time reference means, means controlled by said operational time reference means for utilizing the indications of said indicating means to provide a sensible alarm that the prevailing value of time registered by said register is fast with respect to said primary time reference means, means responsive to comparative indications of said indicating means and to the primary time reference transferred to said secondary time reference means for halting during a corrective interval the control by said operational time reference means over said register to eliminate fast-time deviations found by said comparison to prevail, and means controlled by said secondary time reference means for transferring control over the operations of said time register from said secondary time reference means to said operational time reference means at the end of a preselected interval following said time indication comparison.

17. A time synchronizing system comprising a time register and operational time reference means therein for controlling the register operations to register prevailing values of time, said register including indicating means for providing periodic indications of a preselected value of prevailing time registered by said register, a secondary time reference means, an input circuit adapted to receive at the period of said indications primary-time-indicative electrical synchronizing signals provided by a primary time reference means, means controlled by said indicating means for providing a sensible alarm upon advance of said time register to a preselected value prior to reception of said synchronizing signals, means responsive to each reception of said signal and to absence of said advance of said time register to said preselected value for initiating operation of said secondary time reference means to transfer a primary time reference thereto and for transferring control over the operations of said time register from said operational time reference means to said secondary time reference means, means controlled by said secondary time reference means for utilizing the indications of said indicating means to compare the prevailing value of time registered by said register with the primary time reference transferred to said secondary time reference means and to provide corrective change of register time setting to eliminate time deviations found by said comparison to prevail, and means controlled by said secondary time reference means for transferring control over the operations of said time register from said secondary time reference means to said operational time reference means at the end of a preselected interval following said time indication comparison.

18. A pulse potential responsive control system comprising an input circuit adapted to have applied thereto positive-polarity and negative-polarity potential signal pulses, electrical signal pulse repeater means having two operative states, means enabling said two operative states of said repeater means to be established alternately, control means selectively responsive to said positive polarity signal pulses for controlling said enabling means to operate said repeater means to one operative state thereof and selectively responsive to said negative polarity signal pulses for controlling said enabling means to operate said repeater means to the other operative state thereof, means responsive to each operation of said control means in response to a prevailing signal pulse for continuing the operational control of said control means for a preselected interval beyond the termination of said prevailing signal pulse to reduce any tendency of said control means to effect change of the operational state of said repeater means by reason of transient signal-pulse-terminating inductive surge potentials, and an output electrical control circuit adapted to be controlled by the operative states of said repeater means.

19. A pulse potential responsive control system comprising an input circuit adapted to have applied thereto positive-polarity and negative-polarity potential signal pulses, electrical signal pulse repeater means having two operative states, means enabling said two operative states of said repeater means to be established alternately, first and second control means intercontrolled for operation one at a time and operative to control said enabling means and establish individual operative states of said repeater means, means for providing selective response of a first of said control means to said positive polarity signal pulses for controlling said enabling means to operate said repeater means to one operative state thereof and for providing selective response of the other of said control means to said negative polarity signal pulses for controlling said enabling means to operate said repeater means to the other operative state thereof, means responsive to each operation of said first and second control means in response to a prevailing signal pulse for continuing the operational control thereof over said enabling means for a preselected interval beyond the termination of said prevailing signal pulse to reduce any tendency of the other of said control means to effect changes of the operational state of said repeater means by reason of transient signal-pulse-terminating inductive surge potentials, and an output electrical control circuit adapted to be controlled by the operative states of said repeater means.

20. A pulse potential responsive control system comprising an input circuit adapted to have applied thereto positive-polarity and negative-polarity potential signal pulses, an electrical signal pulse repeater relay having contacts operable between two operative states, means enabling said two operative contact states of said relay to be established alternately, control means selectively responsive to said positive polarity signal pulses for controlling said enabling means to operate said relay and establish one operative state of the contacts thereof and selectively responsive to said negative polarity signal pulses for controlling said enabling means to operate said relay and establish the other operative state of the contacts thereof, means responsive to each operation of said control means in response to a prevailing signal pulse for continuing the operational control of said control means over said enabling means for a preselected interval beyond the termination of said prevailing signal pulse to reduce any tendency of said control means to effect change of the operational state of said relay contacts by reason of transient signal-pulse-terminating inductive surge potentials, and an output electrical control circuit adapted to be controlled by the operative states of the contacts of said repeater relay.

21. A pulse potential responsive control system comprising an input circuit adapted to have applied thereto positive-polarity and negative-polarity potential signal pulses, electrical signal pulse repeater means having two operative states, means enabling said two operative states of said repeater means to be established alternatively, control means including a first electrical relay selectively responsive to said positive polarity signal pulses for controlling said enabling means to operate said repeater means to one operative state thereof and including a second electrical relay selectively responsive to said negative polarity signal pulses for controlling said enabling means to operate said repeater means to the other operative state thereof, means for intercontrolling said relay to prevent concurrent operations thereof, means responsive to each operation of either of said relays in response to a prevailing signal pulse for continuing the operational control thereof over said enabling means for a preselected interval beyond the termination of said prevailing signal pulse to reduce any tendency of the other of said relays to effect change of the operational state of said repeater means by reason of transient signal-pulse-terminating inductive surge potentials, and an output electrical control circuit adapted to be controlled by the operative states of said repeater means.

22. A pulse potential responsive control system comprising an input circuit adapted to have applied thereto positive-polarity and negative-polarity potential signal pulses, an electrical signal pulse repeater relay having contacts operable between two operative states, relay means enabling said two operative contact states of said repeater relay to be established alternately, control means including a first electrical control relay selectively responsive to said positive polarity signal pulses for controlling said enabling relay means to establish one operative state of the contacts of said repeater relay and a second electrical control relay selectively responsive to said negative polarity signal pulses for controlling said enabling relay means to establish the other operative state of the contacts of said repeater relay, each of said control relays including contacts controlling the operation of the other control relay to prevent concurrent control-relay operations, means responsive to each operation of either of said control relays in response to a prevailing signal pulse for continuing the operational control thereof over said enabling relay means for a preselected interval beyond the termination of said prevailing signal pulse to reduce any tendency of the other of said control relays to effect change of the operational state of said repeater relay contacts by reason of transient signal-pulse-terminating inductive surge potentials, and an output electrical control circuit adapted to be controlled by the operative states of the contacts of said repeater relay.

23. A pulse potential responsive control system comprising an input circuit adapted to have applied thereto positive-polarity and negative-polarity potential signal pulses, signal pulse repeater means having two bistable states and means enabling alternate establishment of the bistable states thereof, a pair of repeater control means each operative to establish an individual bistable state of said repeater means, means controlled by and intercoupling said control means for preventing concurrent operations thereof, means selectively responsive to said positive polarity signal pulses for operating one of said control means to establish one of said bistable states of said repeater means and selectively responsive to said negative polarity signal pulses for operating the other of said control means to establish the other of said bistable states of said repeater means, means individual to each said control means and responsive to each said operation thereof by a prevailing signal pulse for continuing the operative state of said each control means for a preselected interval beyond the termination of said prevailing signal pulse to reduce the effect in the other of said control means of transient signal-pulse-terminating inductive surge potentials, and an output electrical control circuit adapted to be controlled by the bistable states of said repeater means.

24. A pulse potential responsive control system comprising an input circuit adapted to have applied thereto positive-polarity and negative-polarity potential signal pulses, a signal pulse repeater relay having contacts operable between two operative states, means having two bistable states enabling said two operative contact states of said repeater relay to be established alternately, a pair of relay control means each operative to establish an individual bistable state of said enabling means, means controlled by and intercoupling said relay control means for preventing concurrent operations thereof, means selectively responsive to said positive polarity signal pulses for operating one of said relay control means to establish one of said bistable states of said enabling means and selectively responsive to said negative polarity signal pulses for operating the other of said control means to establish the other of said bistable states of said enabling means, means individual to each said relay control means and responsive to each said operation thereof by a prevailing signal pulse for continuing the operative state of said each relay control means for a preselected interval beyond the termination of said prevailing signal pulse to reduce the effect on the other of said relay control means of transient signal-pulse-terminating inductive surge potentials, and an output electrical control circuit adapted to be controlled by the operative states of the contacts of said repeater relay.

25. A pulse potential responsive control system comprising an input circuit adapted to have applied thereto positive-polarity and negative-polarity potential signal pulses, a signal pulse repeater relay having contacts operable between two operative states, a latching relay having a first energizable winding for operating relay contacts to a first latched position and having a second energizable winding for unlatching said contacts to a second position, a pair of control relays each operative to permit energization of an individual winding of said latching relay, means controlled by and intercoupling said control relays for preventing concurrent operations thereof, means selectively responsive to said positive polarity signal pulses for operating one of said control relays to energize one of said latching relay windings and through the contacts operated thereby to energize said repeater relay and establish a first operative state of the contacts thereof, means selectively responsive to said negative polarity signal pulses for operating the other of said control relays to energize the other of said latching relay windings and through said latching relay contacts to terminate any energization of said repeater relay and establish the other operative state of the contacts thereof, means individual to each said control relay and responsive to each said operation thereof by a prevailing signal pulse for continuing the operative state if said each control relay for a preselected interval beyond the termination of said prevailing signal pulse to reduce the effect on the other of said control relays of transient signal-pulse-terminating inductive surge potentials, and an output electrical control circuit adapted to be controlled by the operative states of the contacts of said repeater relay.

References Cited

UNITED STATES PATENTS 3,208,049  9/1965  Doty et al. _____ 340—172.5

ROBERT C. BAILEY, *Primary Examiner.*

G. SHAW, *Assistant Examiner.*